(12) United States Patent
Sasaki

(10) Patent No.: US 9,864,979 B2
(45) Date of Patent: Jan. 9, 2018

(54) TRANSACTION TERMINAL DEVICE

(71) Applicant: Panasonic Intellectual Property Management Co., Ltd., Osaka (JP)

(72) Inventor: Makoto Sasaki, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 317 days.

(21) Appl. No.: 14/705,716

(22) Filed: May 6, 2015

(65) Prior Publication Data
US 2016/0063468 A1 Mar. 3, 2016

(30) Foreign Application Priority Data
Aug. 29, 2014 (JP) ................. 2014-176199

(51) Int. Cl.
*G06Q 40/00* (2012.01)
*G06Q 20/20* (2012.01)
*G07G 1/06* (2006.01)
*G07G 1/00* (2006.01)
*G07G 1/12* (2006.01)
*G06F 3/0488* (2013.01)
*G06F 3/0481* (2013.01)
(Continued)

(52) U.S. Cl.
CPC ........... *G06Q 20/20* (2013.01); *G06F 3/0488* (2013.01); *G06F 3/04817* (2013.01);
(Continued)

(58) Field of Classification Search
CPC ......... H04M 2250/22; H04M 1/72583; G06F 3/0482; G06F 1/1694; G06F 3/03547;
(Continued)

(56) References Cited

U.S. PATENT DOCUMENTS 8,255,323 B1\* 8/2012 Casey ............... G06Q 20/3221
705/35
9,728,162 B2\* 8/2017 Sasaki ..................... G09G 5/10
(Continued)

FOREIGN PATENT DOCUMENTS

JP 2000-231670 A 8/2000
JP 2009-157563 A 7/2009
(Continued)

OTHER PUBLICATIONS https://www.ncbi.nlm.nih.gov/pmc/articles/PMC3342758/.\*

*Primary Examiner* — Florian M Zeender
*Assistant Examiner* — Dana Amsdell
(74) *Attorney, Agent, or Firm* — Seed IP Law Group LLP

(57) ABSTRACT

When settlement terminal device performs a settlement process with a settlement destination device (for example, an acquirer or a settlement processor), settlement terminal device displays a screen regarding the settlement process on display unit of touch panel and detects an input operation of important key input reception icon displayed on display unit. CPU determines whether an input operation with respect to this important key input reception icon, that is, an operation for selecting important key input reception icon and dragging and dropping important key input reception icon to YES icon has been performed. When a drag and drop operation of important key input reception icon is detected, CPU executes content of the input operation with respect to important key input reception icon, and transmits a settlement processing request to the settlement destination device. Settlement terminal device facilitates the operator being conscious of an operation with respect to a specific target.

8 Claims, 15 Drawing Sheets

(51) Int. Cl.
*G06F 3/0484* (2013.01)
*G09G 5/00* (2006.01)
*G06F 3/01* (2006.01)

(52) U.S. Cl.
CPC ....... *G06F 3/04842* (2013.01); *G07G 1/0036* (2013.01); *G07G 1/06* (2013.01); *G07G 1/12* (2013.01)

(58) Field of Classification Search
CPC .. G06F 3/0416; G06F 3/0488; G06F 3/04892; G06F 21/36; G06F 2200/1637; G06F 2203/04808; G06F 3/002; G06F 3/017; G06F 3/0486; G06F 3/04886; G06F 1/3228; G06F 2221/2133; G06F 3/0481; G06F 3/0484; G06F 3/04847; G06F 3/1431; G06F 9/4443
See application file for complete search history.

(56) References Cited

U.S. PATENT DOCUMENTS

| | | | | |
|---|---|---|---|---|
| 2005/0259087 A1* | 11/2005 | Hoshino | ................ | G06F 3/016 345/173 |
| 2007/0192692 A1* | 8/2007 | Chen | .................... | G06F 3/0488 715/702 |
| 2007/0273663 A1 | 11/2007 | Park et al. | | |
| 2009/0171801 A1 | 7/2009 | Ryo | | |
| 2010/0137027 A1* | 6/2010 | Kim | .................... | G06F 3/03547 455/556.1 |
| 2011/0055750 A1 | 3/2011 | Fukuda et al. | | |
| 2011/0276879 A1* | 11/2011 | Ando | .................... | G06F 3/0488 715/702 |
| 2012/0169624 A1 | 7/2012 | Garn et al. | | |
| 2013/0106916 A1* | 5/2013 | Guo | ........................ | G06F 21/36 345/672 |
| 2014/0181746 A1* | 6/2014 | Lo | ........................ | G06F 3/04886 715/835 |
| 2015/0135108 A1* | 5/2015 | Pope | ................. | G06K 9/00006 715/767 |
| 2016/0253651 A1* | 9/2016 | Park | ....................... | G06F 3/0482 705/39 |

FOREIGN PATENT DOCUMENTS

| | | |
|---|---|---|
| JP | 2011-048486 A | 3/2011 |
| JP | 2013-080385 A | 5/2013 |
| JP | 2013-131047 A | 7/2013 |
| JP | 2014-506368 A | 3/2014 |

\* cited by examiner

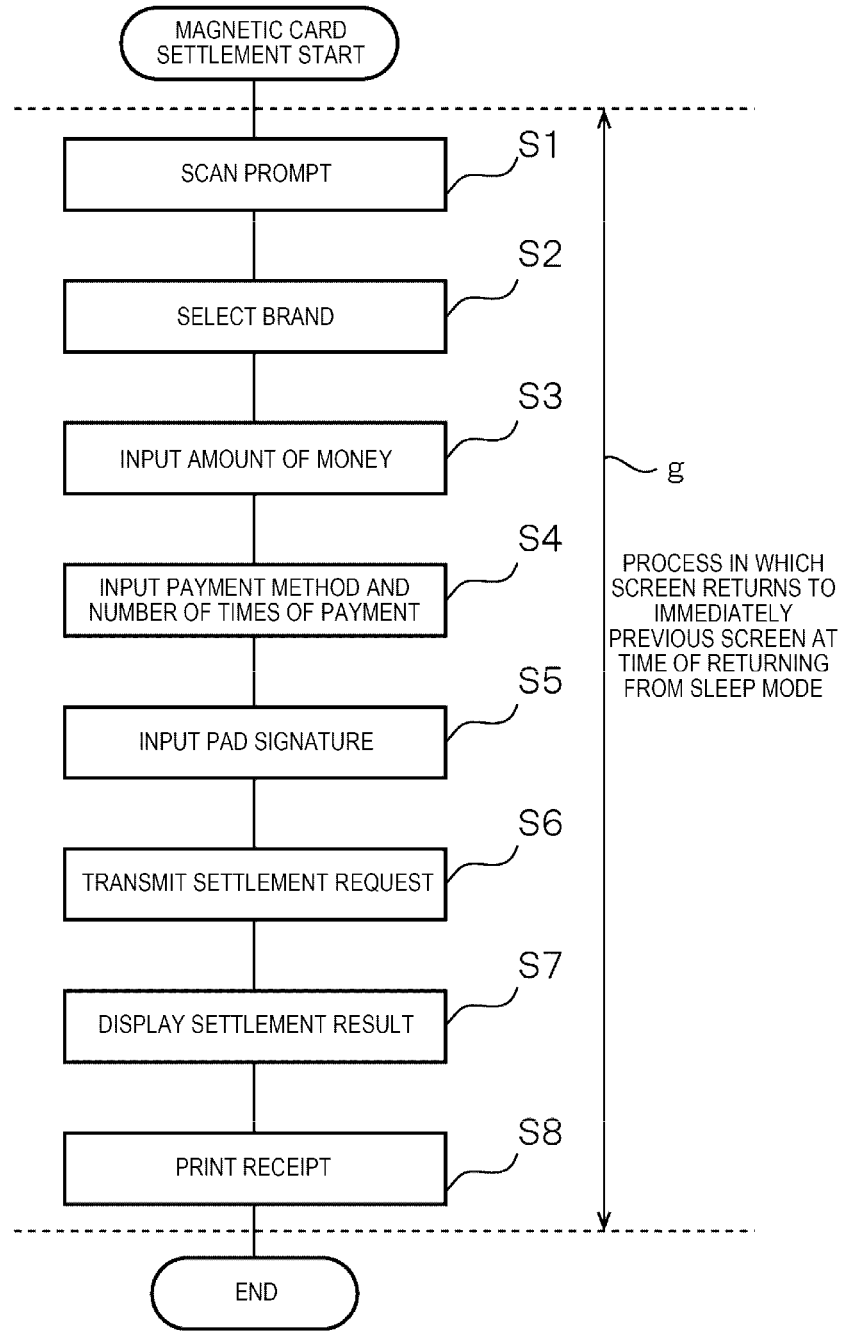

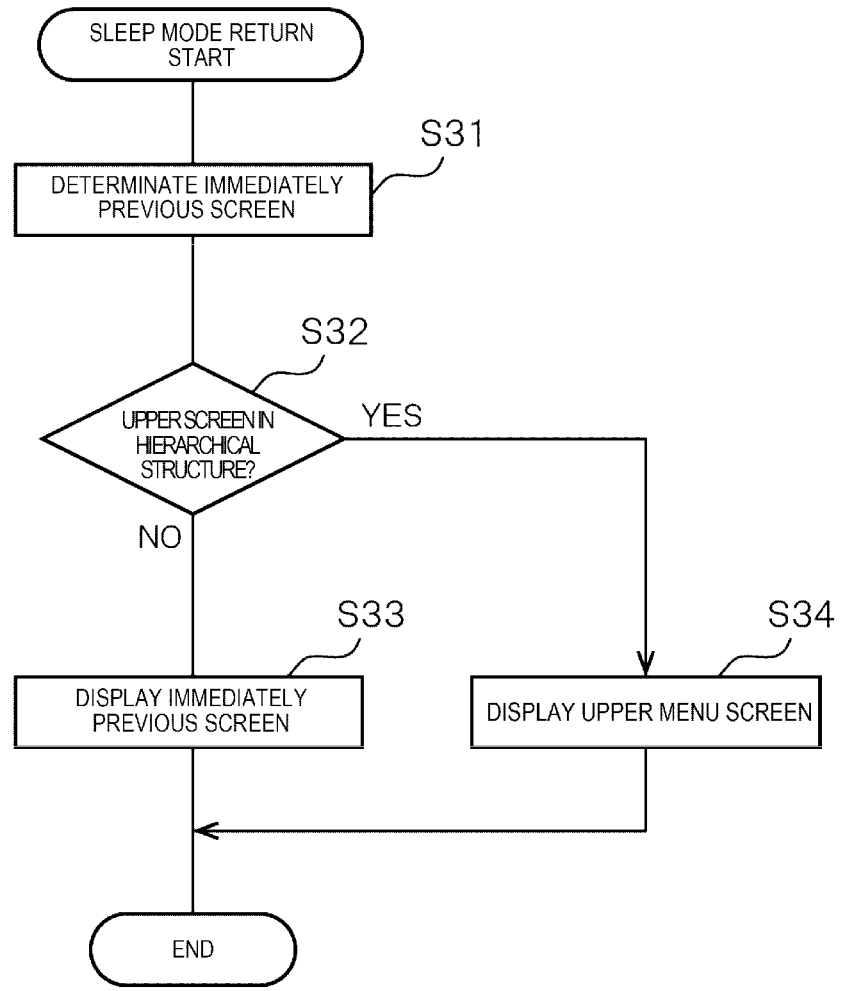

TRANSACTION TERMINAL DEVICE

BACKGROUND OF THE INVENTION

1. Field of the Invention

The present invention relates to a transaction terminal device used to perform a procedure for a settlement process in a transaction.

2. Description of the Related Art

Conventionally, various software keys (also referred to as "software keyboard") are operatively displayed on a touch panel mounted on a transaction terminal device used to perform a procedure of a settlement process in a transaction. These software keys include a sales registration key or a confirmation completion key having an important meaning in the transaction for an operator who mainly uses the transaction terminal device (a clerk of a member shop (for example, a store) that handles, for example, a settlement process for transaction using a credit card carried by a purchaser).

Here, the sales registration key is pressed, for example, when credit for the purchaser is completed without a problem and an amount of purchase is appropriated as an amount of sales money. The confirmation completion key is pressed, for example, when confirmation of content of various items (for example, an amount of purchase, the number of times of payment, a card brand, and a PIN (Personal Identification Number) input by a purchaser) input before communication with a settlement center is started in a transaction using a credit card is completed.

For example, in a small settlement terminal shown in Japanese Patent Unexamined Publication No. 2011-48486 as a prior art regarding a terminal for business that processes content of a transaction using an input operation with respect to a software key of a touch panel, an information display area and an information input area are set in a display area of a touch panel type display unit, and a numeral keypad image pattern is displayed in the information input area so that an input operation with respect to the numeral keypad image pattern can be performed. Further, this small settlement terminal includes a printer, prints information such as a result of the settlement process on a rolled paper built into the terminal in advance, and discharges a receipt on which printing content has been printed from a sheet discharge outlet.

Further, for example, a sales management device with a touch panel shown in Japanese Patent Unexamined Publication No. 2000-231670 measures a time for which an operator presses the touch panel, determines that there is normal pressing of the touch panel when the pressing time exceeds a previously determined pressing recognition time, performs a process according to the pressing of the touch panel, and performs control to neglect content of the process according to the pressing of the touch panel when the pressing time is equal to or less than the previously determined pressing recognition time.

However, in the above-described transaction terminal device, it is difficult to prevent an erroneous operation of a software key having a meaning that is important for an operator, such as the sales registration key or the confirmation completion key described above. For example, when such a software key having an important meaning in a transaction is simply erroneously operated, a trouble is caused for a member shop or for a customer in safe performance of the transaction and inconvenience is caused.

In other words, when an operation having an important meaning in the transaction is performed with the software key, the erroneous operation may be simply induced. For example, in the case of a physical key (for example, a button) rather than the software key, since two-step actions, including an operator contacting the physical key with a finger and the operator pressing the physical key, are necessary, the operator is easily conscious of the physical key having been pressed when performing an operation having an important meaning in the transaction.

However, in the transaction terminal device with a touch panel, since the same operation as the operation of pressing the software key is performed only with the finger of the operator simply contacting the software key displayed on the screen, similarly to a two-step operation with respect to the physical key, the operator is likely to simply erroneously operate the software key having an important meaning in a transaction (hereinafter, referred to as an "important key").

SUMMARY OF THE INVENTION

A transaction terminal device of this disclosure facilitates an operator being definitely conscious of execution of an input operation having an important meaning in a transaction through a predetermined input operation with respect to a touch panel, and suppresses induction of an erroneous operation.

A transaction terminal device of this disclosure includes a settlement processing unit that performs a settlement process with a settlement destination device; a touch panel that displays various screens regarding the settlement process; and an input operation detection unit that detects an input operation with respect to a specific target in the screen displayed on the touch panel, in which when the input operation with respect to the specific target is a predetermined input operation, the settlement processing unit executes a process according to the predetermined input operation.

Further, according to this disclosure, when any one of various screens regarding the settlement process performed between the transaction terminal device and the settlement destination device is displayed on the touch panel, the transaction terminal device detects the input operation with respect to the specific target in the screen, and causes the settlement processing unit to execute the process according to the predetermined input operation when the input operation with respect to the specific target is the predetermined input operation.

According to this disclosure, when an operation having an important meaning in a transaction in the screen displayed on the touch panel, for example, the input operation with respect to a specific target displayed on the screen is a predetermined input operation, the transaction terminal device executes the process according to the predetermined input operation, and thus, it is possible to facilitate the operator being definitely conscious of execution of the input operation having an important meaning in the transaction (that is, execution of the input operation with respect to the specific target of the screen displayed on touch panel), and to suppress induction of an erroneous operation of a software key (important key) having an important meaning in the transaction.

Therefore, according to this disclosure, it is possible to facilitate the operator being definitely conscious of execution of the input operation having an important meaning in a transaction through a predetermined input operation with respect to the touch panel, and to suppress induction of the erroneous operation.

Further, according to this disclosure, it is possible to prevent transition to a sleep mode and rapidly complete the settlement process for the transaction content even when a state in which there is no input operation from the operator lasts over a predetermined time or more in a case in which at least the screen regarding the settlement process is displayed.

Further, according to this disclosure, it is possible to suppress display of a screen not intended by the operator when the sleep mode of the touch panel is released and to improve convenience of the input operation for the operator.

Further, according to this disclosure, some functions or processes are temporarily suppressed or stopped when a printer is operating, and thus, it is possible to reduce a total amount of current flowing into a power supply unit accommodated inside a housing and suppress power consumption.

BRIEF DESCRIPTION OF DRAWINGS

FIG. 11 is a flowchart illustrating a settlement processing procedure of the settlement terminal device of the third exemplary embodiment.

FIG. 12 is a flowchart illustrating a return processing procedure from the sleep mode of the settlement terminal device of the third exemplary embodiment.

DETAILED DESCRIPTION OF PREFERRED EMBODIMENTS

Hereinafter, each exemplary embodiment according to this disclosure will be described with reference to the drawings. A settlement terminal device used to perform a settlement processing procedure in a transaction will be illustrated and described as one example of a transaction terminal device according to this disclosure in each exemplary embodiment below.

First Exemplary Embodiment

Figure 1:
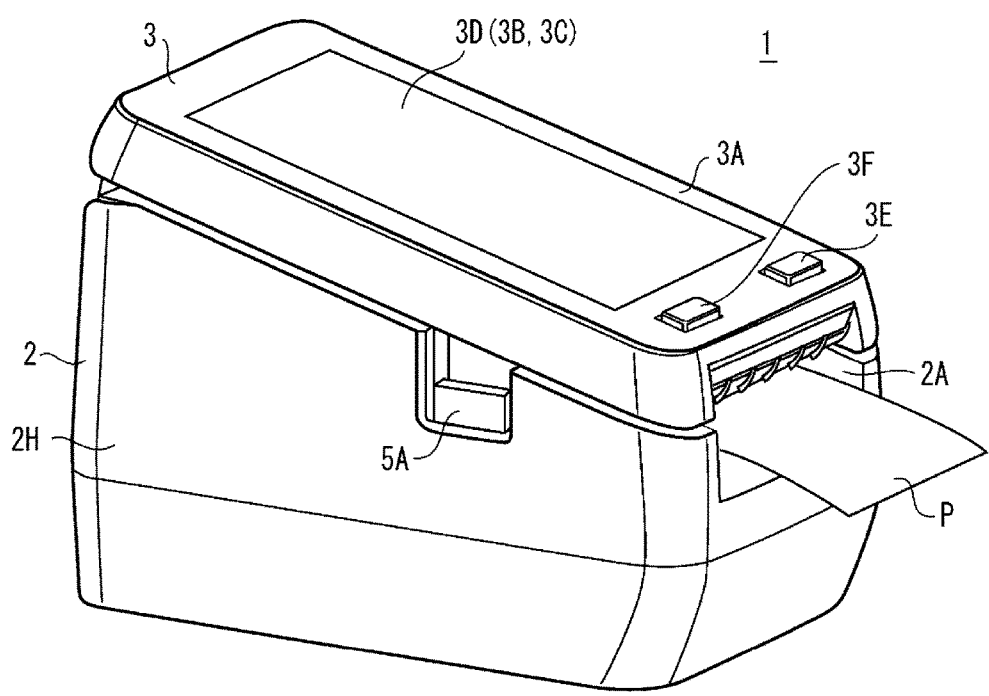
FIG. 1 is a perspective view illustrating an appearance of a settlement terminal device of each of first to fourth exemplary embodiments.

FIG. 1 is a perspective view illustrating an appearance of settlement terminal device 1 in each of first to fourth exemplary embodiments. Settlement terminal device 1 illustrated in FIG. 1 can be used, for example, for a settlement terminal device for performing settlement of a magnetic reading type of credit card.

Settlement terminal device 1 illustrated in FIG. 1 includes main body 2 having a rectangular box shape of which the upper portion is open, and a lid portion 3 with which opening 2A of main body 2 is covered, in opening 2A through which printing paper P is charged. In the following description, it is assumed that the lid portion 3 side is a top and the main body 2 side is a bottom.

The touch panel 3D including display unit 3B (for example, configured using a liquid crystal display plate; see FIG. 2) and touch input detection unit 3C (for example, configured using a touch screen; see FIG. 2), power switch 3E for turning a power supply of settlement terminal device 1 ON or OFF, and return key 3F for cancelling an immediately previous input operation to return to an immediately previous state are provided on an upper surface of lid portion 3.

In settlement terminal device 1 illustrated in FIG. 1, return key 3F may be omitted. In this case, when an input operation with respect to return key 3F is performed with respect to touch panel 3D, substantially the same process as a pressing operation for return key 3F may be performed.

A software operation key as an example of the software keyboard necessary for various operations, a software number key as an example of the software keyboard for performing number input, a number input by the software number key, information necessary to perform various operations, information indicating an operation result, or the like is displayed on display unit 3B constituting touch panel 3D.

Figure 2:
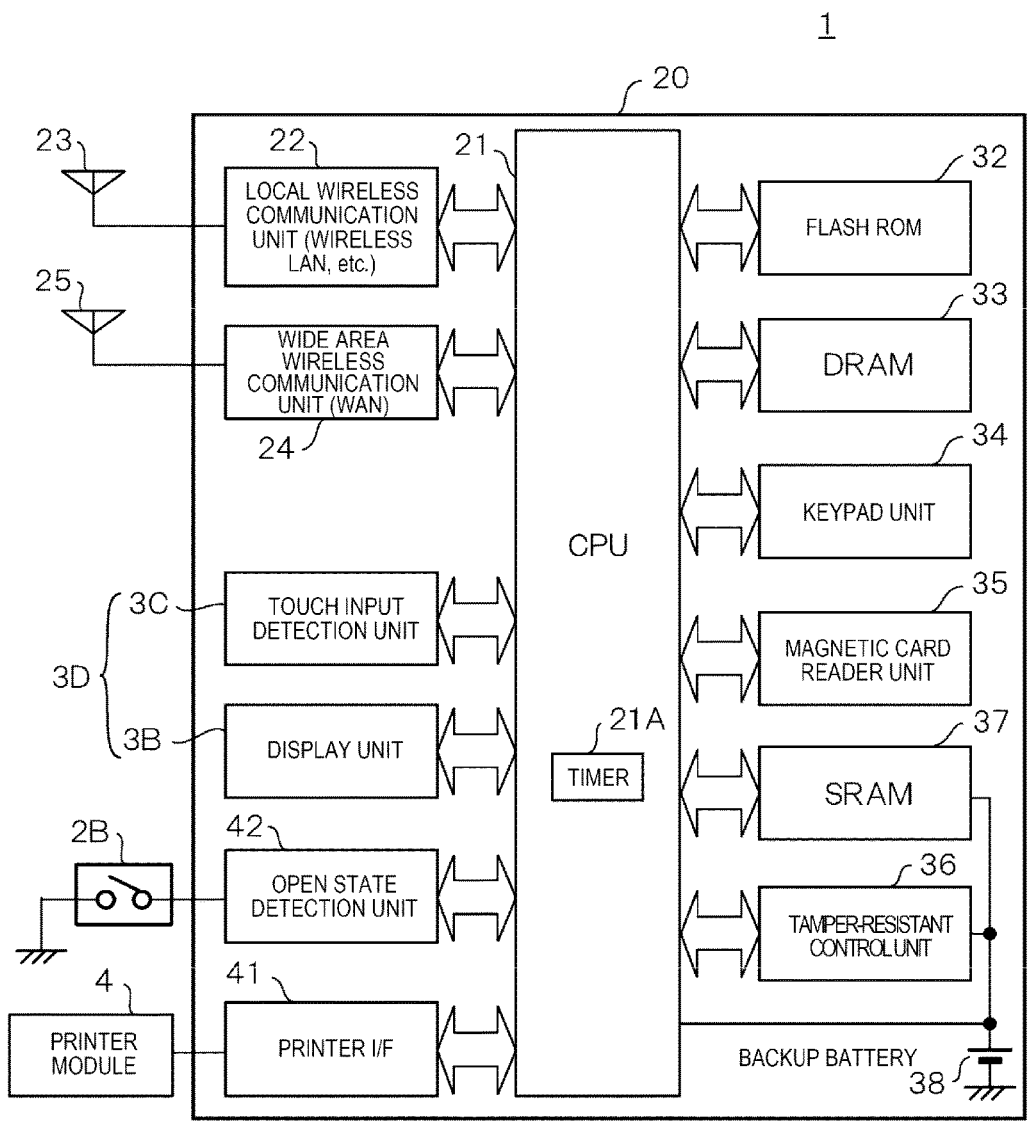
FIG. 2 is a block diagram concretely illustrating an example of a hardware configuration of the settlement terminal device of the first exemplary embodiment.

FIG. 2 is a block diagram concretely illustrating an example of a hardware configuration of settlement terminal device 1 of the first exemplary embodiment. Settlement terminal device 1 illustrated in FIG. 2 includes information processing unit 20.

Information processing unit 20 of settlement terminal device 1 illustrated in FIG. 2 is configured to include CPU 21 for controlling an entire process of each unit of settlement terminal device 1, local wireless communication unit 22 to which local wireless communication antenna 23 is connected, wide area wireless communication unit 24 to which wide area wireless communication antenna 25 is connected, touch panel 3D including display unit 3B and touch input detection unit 3C, flash ROM 32, DRAM 33, keypad unit 34, magnetic card reader unit 35, tamper-resistant control unit 36, SRAM 37, backup battery 38, printer I/F 41 connected to printer module 4, and open state detection unit 42 connected to open state detection switch 2B.

CPU 21 (Central Processing Unit) includes, for example, a timer 21A for detecting a long pressing operation or the like performed by an operator, and performs a control process for generally controlling an entire operation of each unit of settlement terminal device 1, an input and output process of data with each of other units, a data operation (calculation) process, and a data storage process.

Local wireless communication unit 22 is connected to local wireless communication antenna 23, and performs, for example, wireless communication using a wireless LAN (Local Area Network) via a local wireless communication path (not illustrated). The local wireless communication is not limited, for example, to the wireless LAN, and may be Bluetooth (registered trademark) or the like.

Wide area wireless communication unit 24 is connected to wide area wireless communication antenna 25, and performs wide area wireless communication via a wide area wireless communication path (WAN: Wide Area Network) (not illustrated). For the wide area wireless communication, for example, communication using a portable telephone line, such as W-CDMA (Wideband Code Division Multiple Access), UMTS (Universal Mobile Telecommunications System), CDMA (Code Division Multiple Access) 2000, or LTE (Long Term Evolution) can be used.

Settlement terminal device 1 of this exemplary embodiment includes two wireless communication units as communication functions, that is, local wireless communication unit 22 and wide area wireless communication unit 24, but may include any one of the two wireless communication units. Further, settlement terminal device 1 may include a wired communication unit using a wired LAN such as IEEE802.3, a public telephone line, or a dedicated telephone line, in place of the wireless communication unit.

Display unit 3B is configured, for example, using an LCD (Liquid Crystal Display) or an organic EL (Electroluminescence), and displays various application screens, information, and data used in an application (not illustrated) installed in settlement terminal device 1 in response to an instruction of CPU 21.

Touch input detection unit 3C as an example of the input operation detection unit detects an input operation of an operator (for example, a clerk of a member shop of a credit card or a customer who purchases goods) with respect to touch panel 3D.

Flash ROM (Read Only Memory) 32 stores various pieces of data. The stored data may be, for example, data regarding business or may be a program for controlling an operation of settlement terminal device 1 (mainly, information processing unit 20). Further, the program includes various programs related to an operation of settlement terminal device 1, such as a settlement processing application for performing a settlement process with a settlement destination device (for example, an acquirer or a settlement processor) that is an example of a settlement processing unit. Therefore, flash ROM 32 functions as a recording medium that records the program.

The acquirer is a company that collects member shop contracts of dealing with transactions of a specific credit card, and generally controls credit sales. Further, the settlement processor is a company that receives business trust from the acquirer and acts on behalf of the settlement.

DRAM (Dynamic Random Access Memory) 33 is a work memory used, for example, to temporarily store processing data generated midway when a calculation process is performed with an operation of settlement terminal device 1 (mainly, information processing unit 20).

Keypad unit 34 includes power switch 3E and "Return" key 3F illustrated in FIG. 1.

Magnetic card reader unit 35 is provided on a side surface of a main body opposite to a side surface 2H of the main body on which an unlocking button 5A is provided in FIG. 1, together with a slit (not illustrated) on which the magnetic card is slid. Card information that magnetic card reader unit 35 reads from a magnetic stripe of the magnetic card is input to CPU 21.

Printer module 4 as an example of a printing unit is connected to CPU 21 via a printer interface (hereinafter, "printer I/F") 41 that performs bus conversion/signal conversion, and prints information or data indicated by CPU 21 on printing paper P under control of CPU 21.

Open state detection switch 2B is provided in main body 2, detects, for example, that the lid portion 3 is opened by the operator, and outputs a detection result to CPU 21 via open state detection unit 42. That is, a signal indicating whether lid portion 3 is opened or lid portion 3 is closed is input to CPU 21.

Further, a power supply unit (not illustrated) for supplying power to each unit of settlement terminal device 1, as well as information processing unit 20, is provided.

CPU 21, tamper-resistant control unit 36, and SRAM (Static Random Access Memory) 37 are connected to backup battery 38, and receive supply of power from backup battery 38 while supply of the power from power supply unit (not illustrated) is stopped.

Tamper-resistant control unit 36 secures tamper-resistant characteristics of settlement terminal device 1. The "tamper-resistant characteristics" refer to resistance to fraudulent analysis or modification of software or hardware in the device, fraudulent capture or modification of information in the device, or an attack disabling use of the information. That is, the tamper-resistant characteristics are, for example, difficulty in analysis of an internal structure included in the software or the hardware or data stored in the software or the hardware. With the tamper-resistant characteristics, for example, it is possible to protect information of a service reception person (for example, a customer) and safely perform the transaction. The information of the service reception person is stored, for example, in SRAM 37, and, tamper-resistant control unit 36 disables erasure of or access to the information stored in SRAM 37 when tamper-resistant control unit 36 detects fraudulent analysis, modification, attack, information capture, or signs thereof described above.

Further, a non-contact IC card reader and writer unit that reads card information recorded on a non-contact IC card, and a contact type IC card reader unit that reads card information recorded on a contact type IC card may be provided in information processing unit 20. The card information read by the non-contact IC card reader and writer unit or the contact type IC card reader unit is input to CPU 21.

Figure 3:
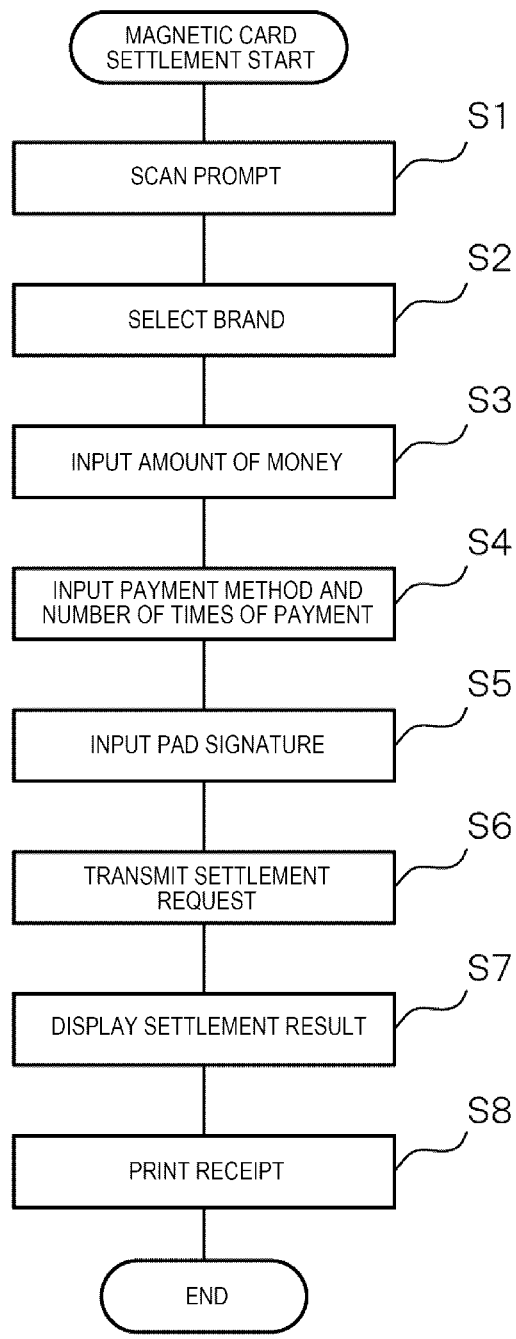
FIG. 3 is a flowchart illustrating a settlement processing procedure of the settlement terminal device of the first exemplary embodiment.

Next, an operation of settlement terminal device 1 of this exemplary embodiment will be described with reference to FIG. 3. FIG. 3 is a flowchart illustrating a settlement processing procedure of settlement terminal device 1 of the first exemplary embodiment. A case in which a settlement process is performed, for example, using a magnetic credit card carried by a customer will be described in FIG. 3.

In FIG. 3, first, CPU 21 causes display unit 3B of touch panel 3D to display a prompt (screen) for promoting an operator to perform a magnetic card reading operation so as to start an application for a settlement process (S1). When a clerk of a member shop (for example, a store) performs a reading operation of the magnetic credit card carried by the customer, the magnetic card reader unit 35 reads information recorded on the magnetic credit card. When CPU 21 receives the information read by magnetic card reader unit 35, CPU 21 causes display unit 3B of touch panel 3D to display an input screen (for example, see FIG. 5) of the transaction content that is a settlement processing target in the settlement processing application.

Then, the clerk of the store performs an operation to input information regarding transaction content that is a settlement processing target to touch panel 3D while receiving confirmation from the customer. CPU 21 detects this input operation through touch input detection unit 3C.

For example, a card brand of the magnetic credit card is selected by the input operation of the operator (for example, a clerk), and information regarding this selected card brand is input to CPU 21 (S2). Then, an amount of settlement money is input by an input operation of the operator (for example, a clerk), and information regarding this input amount of settlement money is input to CPU 21 (S3). Further, a payment method (for example, one-time payment or installment) is selected, the number of times of payment is input, and information regarding the selected payment method and the input number of times of payment is input to CPU 21 (S4).

When the information such as the payment method is input, the customer then inputs a signature of the customer to a signature input area (not illustrated) of a signature PAD displayed on display unit 3B of touch panel 3D. CPU 21 acquires information regarding the input signature through touch input detection unit 3C (S5).

Then, the customer performs an operation with respect to touch panel 3D to finally confirm the input content regarding the transaction content that is a settlement processing target, and performs a predetermined input operation (details thereof will be described below) indicating that the input content has been confirmed. In response to the predetermined operation indicating that the customer has confirmed the input content, CPU 21 performs communication in local wireless communication unit 22 or wide area wireless communication unit 24, and transmits a request for a settlement process including all pieces of input content (for example, the card information, the amount of settlement money, the payment method, and the number of times of payment) that have been input, to an acquirer or a settlement processor (not illustrated) (S6).

When credit is given from the acquirer or the settlement processor as an example of the settlement destination device, and a determination result for permitting transaction content is transmitted to settlement terminal device 1, CPU 21 causes a result of confirming the transaction content that is a settlement processing target to be displayed on display unit 3B of touch panel 3D (S7). Further, CPU 21 causes this confirmation result for the transaction content that is a settlement processing target to be printed as a receipt by printer module 4 (S8). Accordingly, the process of settlement terminal device 1 ends. A unit in which CPU 21 performs a series of processes regarding the settlement process illustrated in FIG. 3 according to a program of the settlement processing application stored in flash ROM 32 corresponds to the settlement processing unit of the transaction terminal device according to the present invention.

Figure 4:
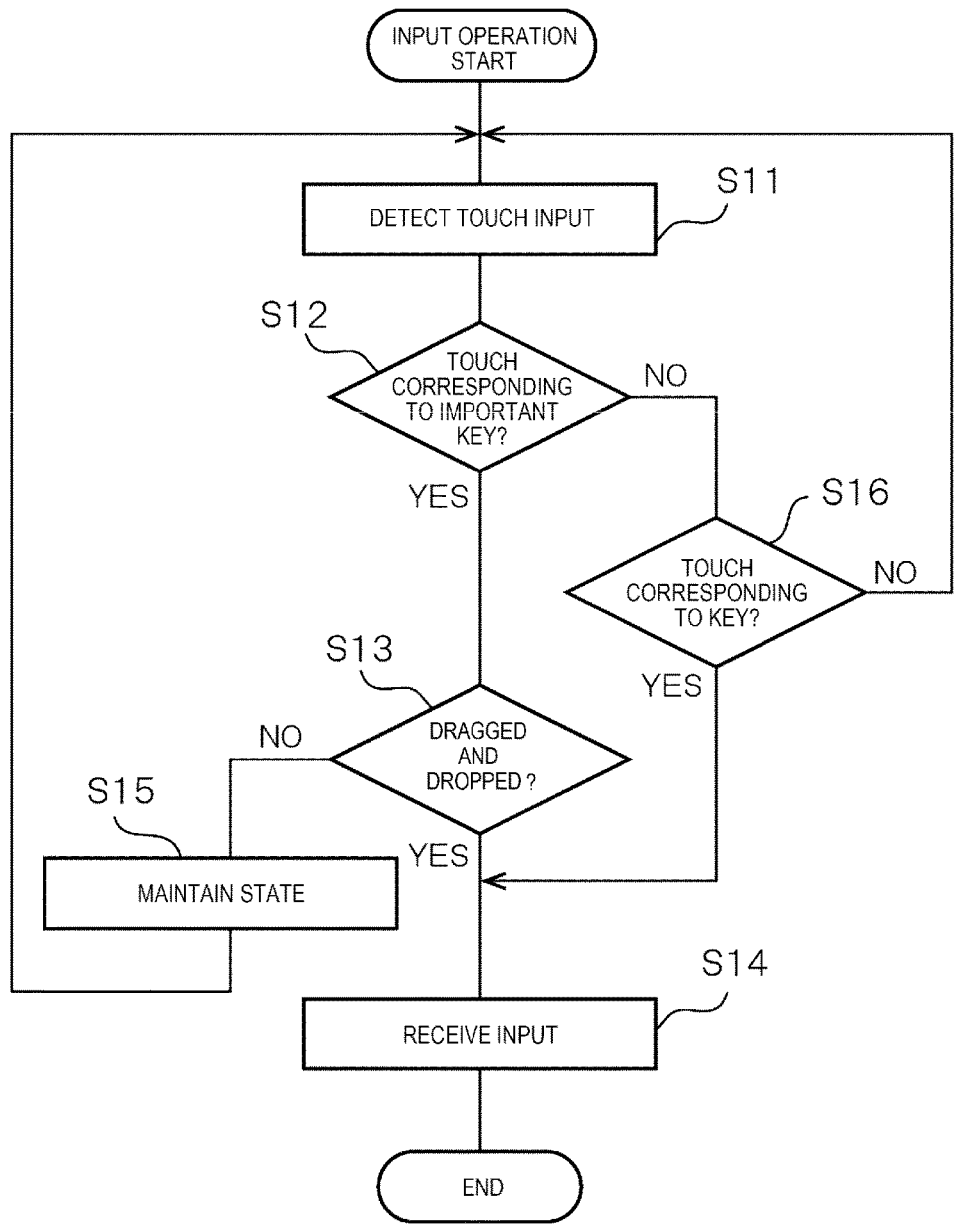
FIG. 4 is a flowchart illustrating a determination procedure for determining whether a predetermined input operation indicating that a customer has confirmed input content regarding transaction content is performed in step S6 illustrated in FIG. 3.

FIG. 4 is a flowchart illustrating a determination procedure for determining whether a predetermined input operation is performed to indicate that the customer has confirmed the input content for the transaction content in step S6 illustrated in FIG. 3. Each process of the flowchart illustrated in FIG. 4 is performed, for example, in step S6 illustrated in FIG. 3.

In FIG. 4, CPU 21 detects the input operation (touch input) of the operator in touch input detection unit 3C of touch panel 3D (S11). CPU 21 determines whether the touch input detected by touch input detection unit 3C is an input operation with respect to predetermined important key input reception icon 61 (see FIG. 5) as an example of a specific target in the input screen for the transaction content, which is a settlement process settlement processing target application (S12). Here, a coordinate of important key input reception icon 61 in the input screen for the transaction content that is a settlement processing target of the settlement processing application is registered in flash ROM 32 in advance by a time point when important key input reception icon 61 is displayed. CPU 21 determines whether there is a touch input with respect to important key input reception icon 61 by matching the coordinate of the important key input reception icon 61 with a touch input position (coordinate).

When it is determined that the input is a touch input with respect to important key input reception icon 61 (YES in S12), CPU 21 determines whether a predetermined input operation with respect to important key input reception icon 61 has been performed (S13). The predetermined input operation includes, for example, a selecting operation for important key input reception icon 61 illustrated in FIG. 5, a moving operation for important key input reception icon 61 during the selecting operation, and a deselecting operation for important key input reception icon 61 after the moving operation. More specifically, the predetermined input operation is a drag and drop operation, and is an operation of selecting important key input reception icon 61, dragging (moving) important key input reception icon 61 to either YES icon 63 or NO icon 65, and dropping (deselecting) important key input reception icon 61 in the position.

When, for example, the drag and drop operation of the important key input reception icon 61 to YES icon 63 is performed (YES in S13) as a predetermined input operation with respect to important key input reception icon 61, CPU 21 determines that the predetermined input operation (input confirmation) with respect to important key input reception icon 61 is performed (input reception; S14). Accordingly, the process of CPU 21 illustrated in FIG. 4 ends. Further, even when, for example, the drag and drop operation of important key input reception icon 61 to NO icon 65 is performed as the predetermined input operation with respect to important key input reception icon 61 (YES in S13), CPU 21 determines that a predetermined input operation (negative) with respect to the important key input reception icon 61 is performed (input reception; S14). Accordingly, the process of CPU 21 illustrated in FIG. 4 ends.

On the other hand, when the predetermined input operation with respect to the important key input reception icon 61 is not performed or when the operation of dragging and dropping important key input reception icon 61 to YES icon 63 over a predetermined time is not performed (NO in S13), CPU 21 maintains a state of the touch operation input in step S11 (S15), and the process of CPU 21 returns to step S11.

Further, when it is not determined that the touch input detected by touch input detection unit 3C is a touch input with respect to important key input reception icon 61 (NO in S12), CPU 21 determines that the input operation is performed (input reception, S14) if the touch input detected by touch input detection unit 3C is a key (that is, a key other than the important key) (YES in S16), and the process of CPU 21 returns to step S11 if the touch input is not a key (NO in S16). A process in which CPU 21 determines the input operation illustrated in FIG. 4 according to the program stored in flash ROM 32 corresponds to an input operation determination unit of the transaction terminal device according to the present invention.

Figure 5:
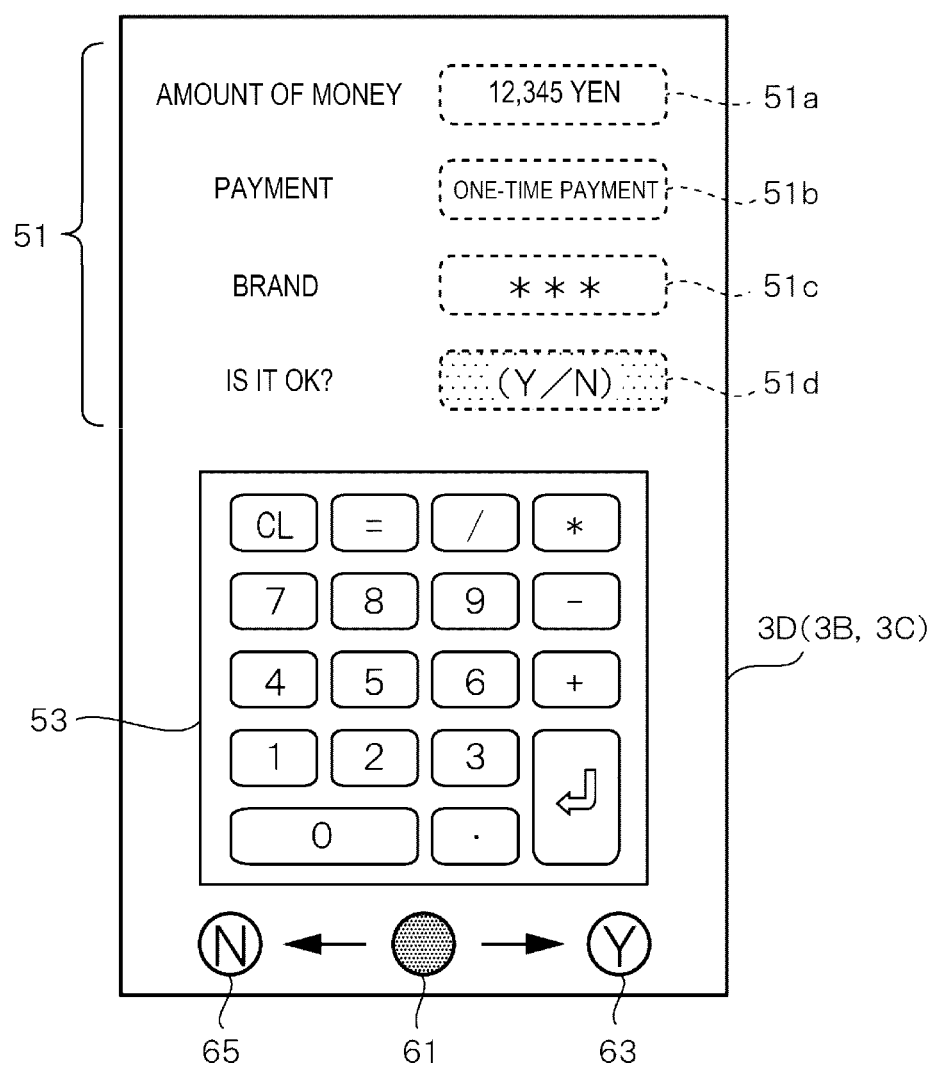
FIG. 5 is a diagram illustrating a screen displayed on a touch panel mounted on the settlement terminal device.

FIG. 5 is a diagram illustrating a screen displayed on touch panel 3D mounted on settlement terminal device 1. An input screen of transaction content that is a settlement processing target in the settlement processing application is displayed on display unit 3B of touch panel 3D, and various pieces of information 51 regarding the settlement process are displayed in this input screen. Various pieces of information 51 regarding the settlement process, for example, an amount of settlement money, a payment method, a card brand of a magnetic credit card, and a transaction content confirmation item are displayed.

Specifically, information of "Amount of money 12,345 Yen," "Payment one-time payment," "Brand *" (* is a brand name of the credit card)," and "Is it OK (Y/N)" is displayed. Touch input detection unit 3C can detect a touch input of the operator with respect to input areas 51a, 51b, 51c, and 51d corresponding to display positions of the respective pieces of information in the input screen for the transaction content illustrated in FIG. 5. Among the input areas 51a, 51b, 51c, and 51d, for example, the input area 51d is displayed so as to confirm the input content of the transaction content and corresponds to an important key (specific target) having an important meaning in the input screen for the transaction content.

Further, numeral keypad 53 is displayed as an example of the software keyboard under the information 51 regarding the settlement process. Further, important key input reception icon 61, YES icon 63, and NO icon 65 provided for CPU 21 to determine that a predetermined input operation with respect to the important key is performed are displayed under numeral keypad 53. In this exemplary embodiment, the important key is not limited to confirmation item (that is, "Y/N") of the input content of the transaction content displayed to correspond to input area 51d illustrated in FIG. 5, and may be, for example, the sales registration key or the confirmation completion key described above.

Content displayed in input areas 51a, 51b, 51c, and 51d displayed on display unit 3B of touch panel 3D can be changed when a touch input is performed with respect to any corresponding input area. For example, the amount of sales money is changed when input area 51a indicating an amount of money is tapped and then numeral keypad 53 is touched. Further, when input area 51a is an important key and the amount of sales money is to be confirmed, the operator taps and selects input area 51a and then drags and drops important key input reception icon 61 to a position of YES icon 63. Accordingly, the amount of sales money (amount of settlement money) is determined.

Further, input area 51d of "Is it OK? (Y/N)" for finally confirming various pieces of information 51 regarding the settlement process is described as the important key in this exemplary embodiment. The operator drags and drops important key input reception icon 61 to the position of YES icon 63 in a state in which "Is it OK? (Y/N)" is displayed or after the operator taps and selects this important key (see FIG. 5). Thus, the input confirmation of the transaction content is performed by the operator. On the other hand, when the operator drags and drops important key input reception icon 61 to a position of NO icon 65, the input confirmation of the transaction content is denied, and thus, changing the input item is performed.

Accordingly, when any one of various screens regarding the settlement process performed between settlement terminal device 1 of this exemplary embodiment and the settlement destination device is displayed on touch panel 3D, settlement terminal device 1 of this exemplary embodiment detects the input operation with respect to a specific target (for example, important key input reception icon 61) in the screen, determines whether the input operation with respect to important key input reception icon 61 is a predetermined input operation, and executes a process according to the predetermined input operation (for example, a request for a settlement process with the settlement destination device after the input confirmation of transaction content) when the input operation with respect to important key input reception icon 61 is the predetermined input operation.

Accordingly, when an operation having an important meaning in the transaction in the screen displayed on touch panel 3D, for example, the input operation with respect to important key input reception icon 61 displayed on the screen is the predetermined input operation, settlement terminal device 1 executes the process according to the predetermined input operation, and thus, it is possible to facilitate the operator being definitely conscious of execution of the input operation having an important meaning in the transaction (that is, execution of the input operation with respect to the important key input reception icon 61 of the screen displayed on touch panel 3D), and to suppress induction of an erroneous operation of the software key (important key) having an important meaning in the transaction.

Further, since settlement terminal device 1 causes touch panel 3D to display predetermined important key input reception icon 61 in the screen regarding the settlement process, it is possible to cause the operator to be definitely conscious of the predetermined input operation with respect to important key input reception icon 61 being always necessary when the input operation with respect to the important key is performed in the screen displayed on touch panel 3D.

Further, when the drag and drop operation with respect to important key input reception icon 61 is performed in the screen displayed on touch panel 3D, settlement terminal device 1 executes the settlement process for the important key, and thus, it is possible to simply suppress an erroneous operation of the operator in comparison with the drag and drop operation being an operation frequently used in, for example, a general-purpose PC (Personal Computer) or the like.

In the first exemplary embodiment described above, in order for the operator to be made conscious of the input operation with respect to the important key, important key input reception icon 61 is dragged and dropped, but the predetermined input operation with respect to the important key input reception icon 61 is not limited to this drag and drop operation.

For example, when important key input reception icon 61 is long pressed over a predetermined time, and then, a selecting operation (for example, a double tapping operation) is performed one or more times in the screen displayed on touch panel 3D, settlement terminal device 1 executes the settlement process for the important key, similarly to the case in which the drag and drop operation with respect to important key input reception icon 61 is performed. Accordingly, since settlement terminal device 1 does not have to move important key input reception icon 61 on the screen unlike in the drag and drop operation, and an operation range of an instruction medium for touch panel 3D on the screen (for example, a finger of the operator or a stylus pen) may be narrow, the operator can operate a predetermined input operation more easily. The same can be implemented even when long pressing is performed after the one or more selecting operations.

Process of Reaching Content of the Second Exemplary Embodiment

First, a process of reaching content of settlement terminal device 1 of the second exemplary embodiment will be described prior to describing the second exemplary embodiment.

When the operator does not perform any input operation for a predetermined time (for example, one minute), the transaction terminal device in the related art including Japanese Patent Unexamined Publication No. 2011-48486 described above transitions to the sleep mode (that is, a mode in which the power supply of the display unit of the touch panel is temporarily turned off), for example, so as to achieve screen burn-in prevention and power savings in a PC.

However, since the settlement process may take much time, the transition to the sleep mode stops the settlement process midway. A case in which the settlement process takes much time may include, for example, a case in which a network environment is not good between the settlement terminal device and a settlement center and a communication process needs time. Further, if a number of settlement terminal devices are connected to the settlement center, a response of the settlement process may not be obtained from the settlement destination device even when the settlement terminal device transmits a request of the settlement process (for example, credit inquiry). Further, when the settlement terminal device is configured as a thin client, an amount of data transmission flowing through a network between the settlement terminal device and the settlement destination device greatly increases in comparison with a conventional rich client.

Therefore, once the settlement process stops, an operation of returning from the sleep mode should be necessarily performed so as to restart the settlement process. A returning process may often require time and a customer may wait.

Second Exemplary Embodiment

Therefore, an example of the transaction terminal device in which the transition to the sleep mode is prevented and the settlement process for the transaction content is rapidly completed even when a state in which there is no input operation from the operator lasts over a predetermined time or more in a case in which at least the screen regarding the settlement process is displayed will be described in the second exemplary embodiment.

Since an appearance of settlement terminal device 1 of the second exemplary embodiment is the same as the appearance of the settlement terminal device of the first exemplary embodiment described above (see FIG. 1), the same reference signs are used and description thereof will be omitted. Further, since a hardware configuration of settlement terminal device 1 in the second exemplary embodiment is the same as that of the settlement terminal device of the first exemplary embodiment described above (see FIG. 2), the same reference signs are used and description thereof will be omitted. Hereinafter, a different operation from that of the first exemplary embodiment described above, and an operation regarding control of the transition to the sleep mode will be described.

When any screen is displayed on touch panel 3D, settlement terminal device 1 of this exemplary embodiment detects the input operation with respect to the screen, but when the input operation is not detected over a certain time or more in the screen, settlement terminal device 1 causes touch panel 3D to transition to the sleep mode, similarly to the first exemplary embodiment. In the sleep mode, display unit 3B of touch panel 3D turns off the screen, and touch input detection unit 3C does not detect the input operation. In the sleep mode, touch input detection unit 3C may detect the input operation.

Figure 6:
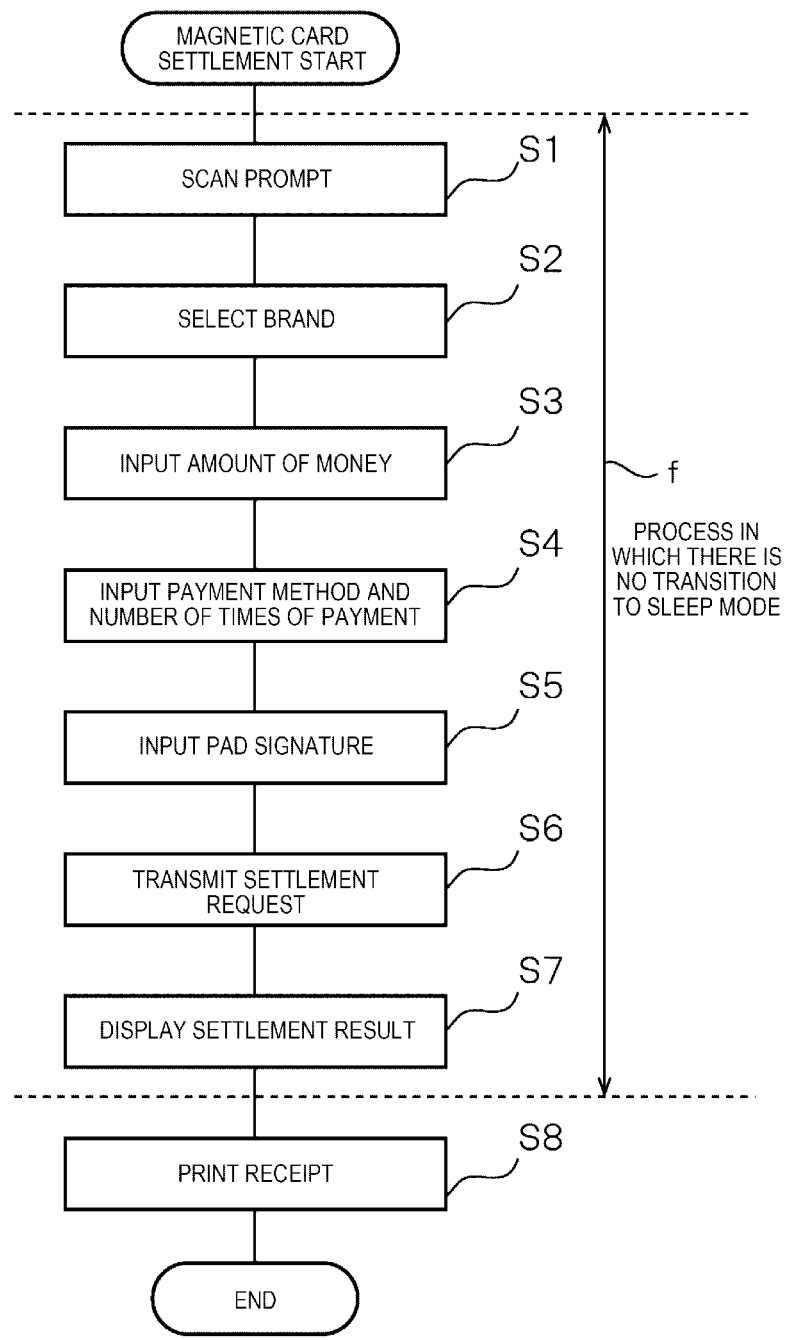
FIG. 6 is a flowchart illustrating a settlement processing procedure of the settlement terminal device of the second exemplary embodiment.

FIG. 6 is a flowchart illustrating a settlement processing procedure of settlement terminal device 1 of the second exemplary embodiment. Since each process of the flowchart illustrated in FIG. 6 is the same as each process of the flowchart illustrated in FIG. 3 in the first exemplary embodiment described above, concrete description of each process will be omitted.

However, since each process illustrated in FIG. 6 is a process regarding the settlement process, settlement terminal device 1 of this exemplary embodiment does not cause display unit 3B of touch panel 3D to transition to the sleep mode even when the input operation with respect to the screen of display unit 3B of touch panel 3D is not detected. More specifically, settlement terminal device 1 does not cause display unit 3B of touch panel 3D to transition to the sleep mode during a period indicated by arrow fin FIG. 6 (that is, between a scan prompt display process of prompting to read the magnetic credit card in step S1 and a process of displaying the result of confirming the transaction content that is a settlement processing target in step S7). In the receipt printing process of step S8, settlement terminal device 1 may cause display unit 3B of touch panel 3D to transition to the sleep mode.

Particularly, in each process of steps S6 and S7 in which communication is performed with the settlement destination device, settlement terminal device 1 omits the transition of display unit 3B of touch panel 3D to the sleep mode. Further, in each process of steps S1 to S5, a case in which the input operation of the operator takes time is also assumed. The case includes, for example, a case in which a clerk leaves his or her seat to confirm goods or a case in which a customer no longer stays in situ due to a sudden errand.

Thus, when it is considered that the operation of the operator is assumed to take time, settlement terminal device 1 may cause display unit 3B of touch panel 3D to transition to the sleep mode in each process of steps S1 to S5.

Figure 7:
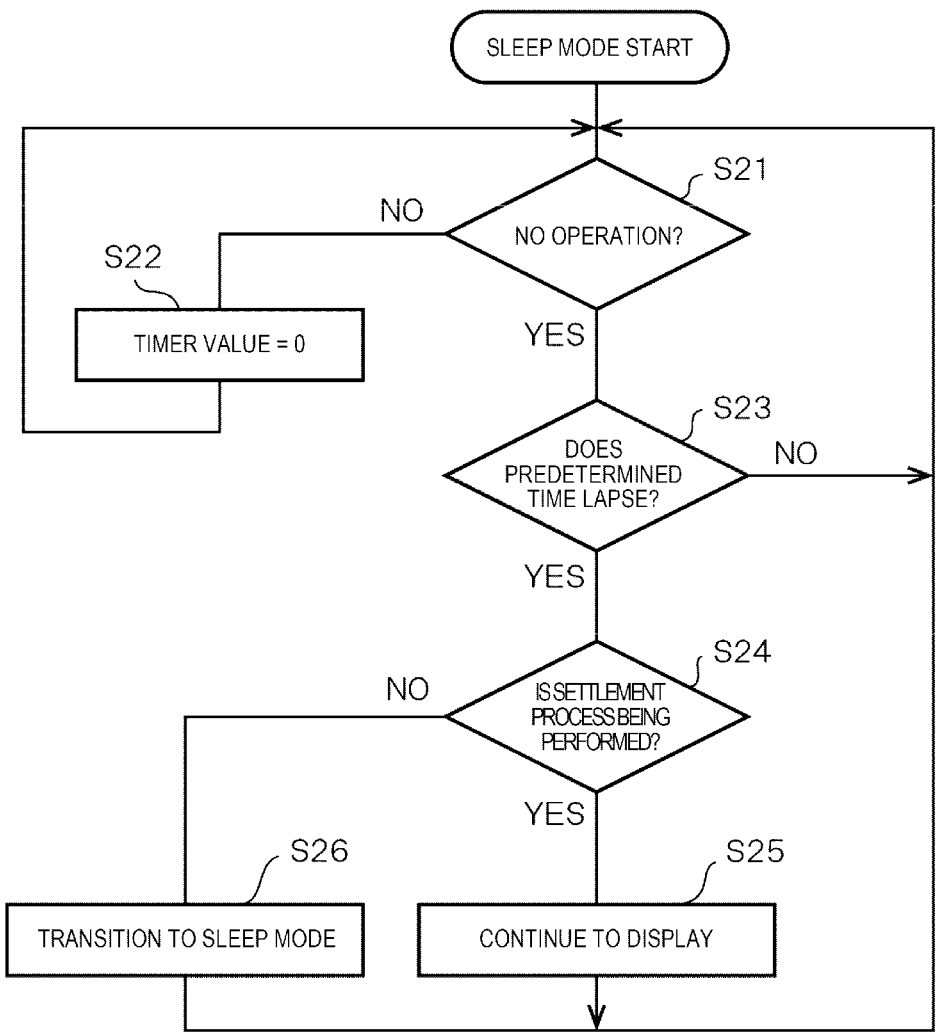
FIG. 7 is a flowchart illustrating a sleep mode transition processing procedure of the settlement terminal device of the second exemplary embodiment.

FIG. 7 is a flowchart illustrating a sleep mode transition processing procedure of settlement terminal device 1 of the second exemplary embodiment.

In FIG. 7, CPU 21 determines whether an input operation with respect to touch panel 3D is not performed by the operator and there is no operation based on a signal from touch input detection unit 3C indicating whether the input operation has been detected or not (S21). For example, when any input operation rather than no operation is detected (NO in S21), CPU 21 sets a count value (timer value) of timer 21A to 0 (S22). Then, the process of CPU 21 returns to step S21.

On the other hand, when it is determined that there is no operation (YES in S21), CPU 21 determines whether timer 21A reaches a predetermined time (for example, one minute) or more (S23).

When the predetermined time does not lapse (NO in S23), the process of CPU 21 returns to step S21.

On the other hand, when the predetermined time lapses (YES in S23), CPU 21 determines whether a settlement process is currently being performed (S24). For example, the settlement process refers to a case in which the application for a settlement process described above starts up and is executing the process of any one of steps S1 to S7 illustrated in FIG. 6.

When the settlement process is being performed (YES in S24), CPU 21 omits the transition of display unit 3B of touch panel 3D to the sleep mode, and causes display (for example, see FIG. 8A) of the screen regarding the settlement process displayed on display unit 3B to be continued (S25). The process of CPU 21 then returns to step S21.

On the other hand, when the settlement process is not being processed (NO in S24), CPU 21 causes display unit 3B of touch panel 3D to transition to the sleep mode and turns off display unit 3B (see FIG. 8B) to darken the screen (S26). The process of CPU 21 then returns to step S21. Further, the process in which CPU 21 controls the transition to the sleep mode illustrated in FIG. 7 according to the program stored in flash ROM 32 corresponds to a sleep mode control unit of the transaction terminal device according to the present invention.

Figure 8A:
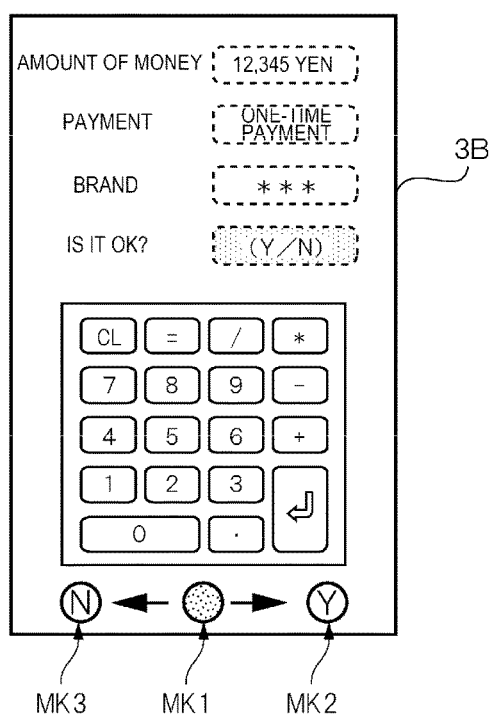
FIG. 8A is a diagram illustrating a screen regarding a settlement process.
Figure 8B:
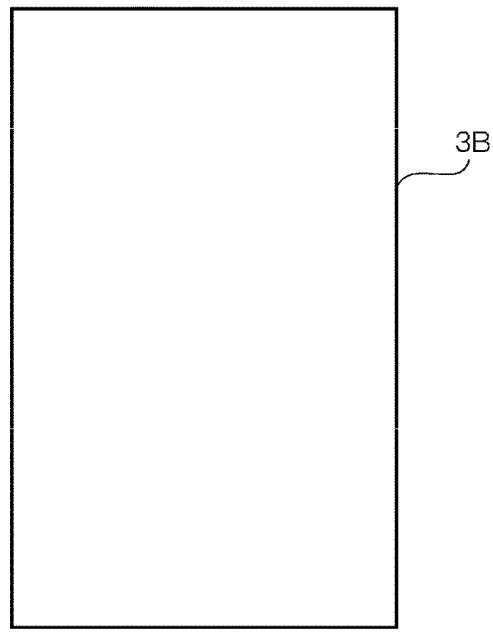
FIG. 8B is a diagram illustrating a screen of the display unit when transition to a sleep mode is performed.

FIG. 8A is a diagram illustrating a screen regarding the settlement process. FIG. 8B is a diagram illustrating the screen of display unit 3B when display unit 3B transitions to the sleep mode. Input reception icon MK1, YES icon MK2, and NO icon MK3 in FIG. 8A correspond to important key input reception icon 61, YES icon 63, and NO icon 65 illustrated in FIG. 5 of the first exemplary embodiment, respectively. In FIG. 8B, the screen is caused to be a white background to indicate turn-off of display unit 3B.

As described above, when any screen is displayed on touch panel 3D, settlement terminal device 1 of this exemplary embodiment detects the input operation with respect to the screen. However, when the input operation is not detected over a certain time or more in the screen, settlement terminal device 1 causes touch panel 3D to transition to the sleep mode. Further, when at least a screen regarding the settlement process performed between settlement terminal device 1 and the settlement destination device is being displayed on display unit 3B of touch panel 3D, settlement terminal device 1 omits the transition of touch panel 3D to the sleep mode and continues to display content displayed on display unit 3B of touch panel 3D even when the input operation with respect to the screen is not detected over a predetermined time or more.

Accordingly, when at least a screen regarding the settlement process performed between settlement terminal device 1 and the settlement destination device is being displayed on display unit 3B of touch panel 3D, settlement terminal device 1 can prevent the transition of touch panel 3D to the sleep mode even when a state in which there is no input operation from the operator lasts over a predetermined time or more. Therefore, since the settlement process is not temporarily interrupted and an input operation for return from the sleep mode is not necessary, the settlement process for the transaction content can be rapidly completed.

Further, when settlement terminal device 1 is performing communication of the settlement process for the transaction content (for example, credit inquiry or sales registration) with the settlement destination device, settlement terminal device 1 does not transition to the sleep mode of display unit 3B of touch panel 3D and continues to display content displayed on display unit 3B of touch panel 3D. Accordingly, it is possible to prevent interruption of communication with the settlement destination device and reliably complete the settlement process with the settlement destination device.

Process of Reaching Content of the Third Exemplary Embodiment

First, a process of reaching content of settlement terminal device 1 of the third exemplary embodiment will be described prior to describing the third exemplary embodiment.

In the transaction terminal device in the related art including Japanese Patent Unexamined Publication No. 2011-48486 described above, if a next input operation is not detected even when a predetermined time (for example, one minute) lapses after the input operation of the operator is detected, the screen is caused to transition to the sleep mode so as to achieve screen burn-in prevention and power savings. Further, when the transaction terminal device detects any input operation of the operator in the sleep mode, the transaction terminal device releases the sleep mode of the screen and displays a screen displayed immediately before the transition to the sleep mode.

However, in the transaction terminal device in the related art, when any input operation not intended by the operator is detected and then the transaction terminal device transitions to the sleep mode (for example, when the operator inadvertently contacts the touch panel or performs an operation recognized as incorrect input (so-called erroneous operation) and then the transaction terminal device transitions to the sleep mode due to no operation of the operator for a certain time or more), the following situation is assumed. That is, when the operator performs any input operation with respect to the transaction terminal device that has not transitioned to the sleep mode, the transaction terminal device may display a user-unintended screen when the sleep mode is released.

As a result, there are problems in that the operator is confused due to display of the unintended screen, and should spend considerable time and effort before starting an originally intended input operation.

Third Exemplary Embodiment

Therefore, an example of a transaction terminal device in which display of an operator-unintended screen immediately after the sleep mode of the transaction terminal device is released is suppressed and convenience of the input operation with respect to the operator is improved will be described in the third exemplary embodiment.

Since an appearance of settlement terminal device 1 of the third exemplary embodiment is the same as the appearance of the settlement terminal device of the first exemplary embodiment described above (see FIG. 1), the same reference signs are used and description thereof will be omitted.

Figure 9:
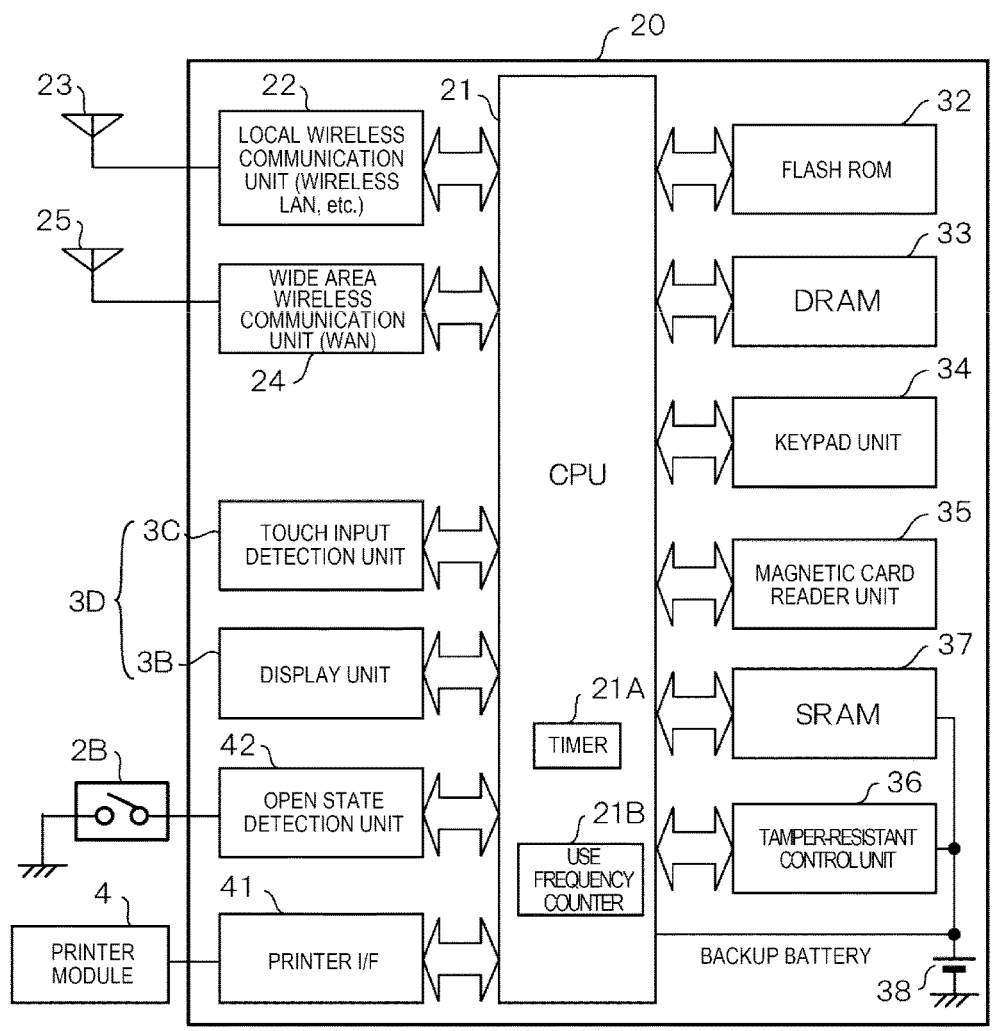
FIG. 9 is a block diagram concretely illustrating an example of a hardware configuration of the settlement terminal device of the third exemplary embodiment.

FIG. 9 is a block diagram concretely illustrating an example of a hardware configuration of settlement terminal device 1 of the third exemplary embodiment. Further, in the hardware configuration of settlement terminal device 1, the same components as those of settlement terminal device 1 of the first exemplary embodiment are denoted with the same reference signs and description thereof will be omitted.

CPU 21 further includes use frequency counter 21B that counts the number of times of display (display frequency; use frequency) of a screen (for example, a menu screen) displayed on display unit 3B, in addition to timer 21A described in the first exemplary embodiment.

For a plurality of menu screens to which a predetermined hierarchical relationship (hierarchical structure; see FIG. 10, for example) is assigned, use frequency counter 21B counts the number of times of display of each menu screen on display unit 3B of touch panel 3D. For example, when CPU 21 reads the menu screen corresponding to content of various applications registered in flash ROM 32 in advance and causes the menu screen to be displayed on the display unit 3B of touch panel 3D, use frequency counter 21B increases (increments) a value of the number of times of display of the menu screen by "1". Further, it is preferable that, when use frequency counter 21B increments the number of times of display, CPU 21 stores date and time information from timer 21A together in use frequency counter 21B.

As described below, the menu screen having a high use frequency (of which the number of times of display is great) is selected as a return destination (that is, a screen to be displayed on display unit 3B of touch panel 3D) when the menu screen assigned to a lower layer than a layer corresponding to the menu screen is released from the sleep mode.

Figure 10:
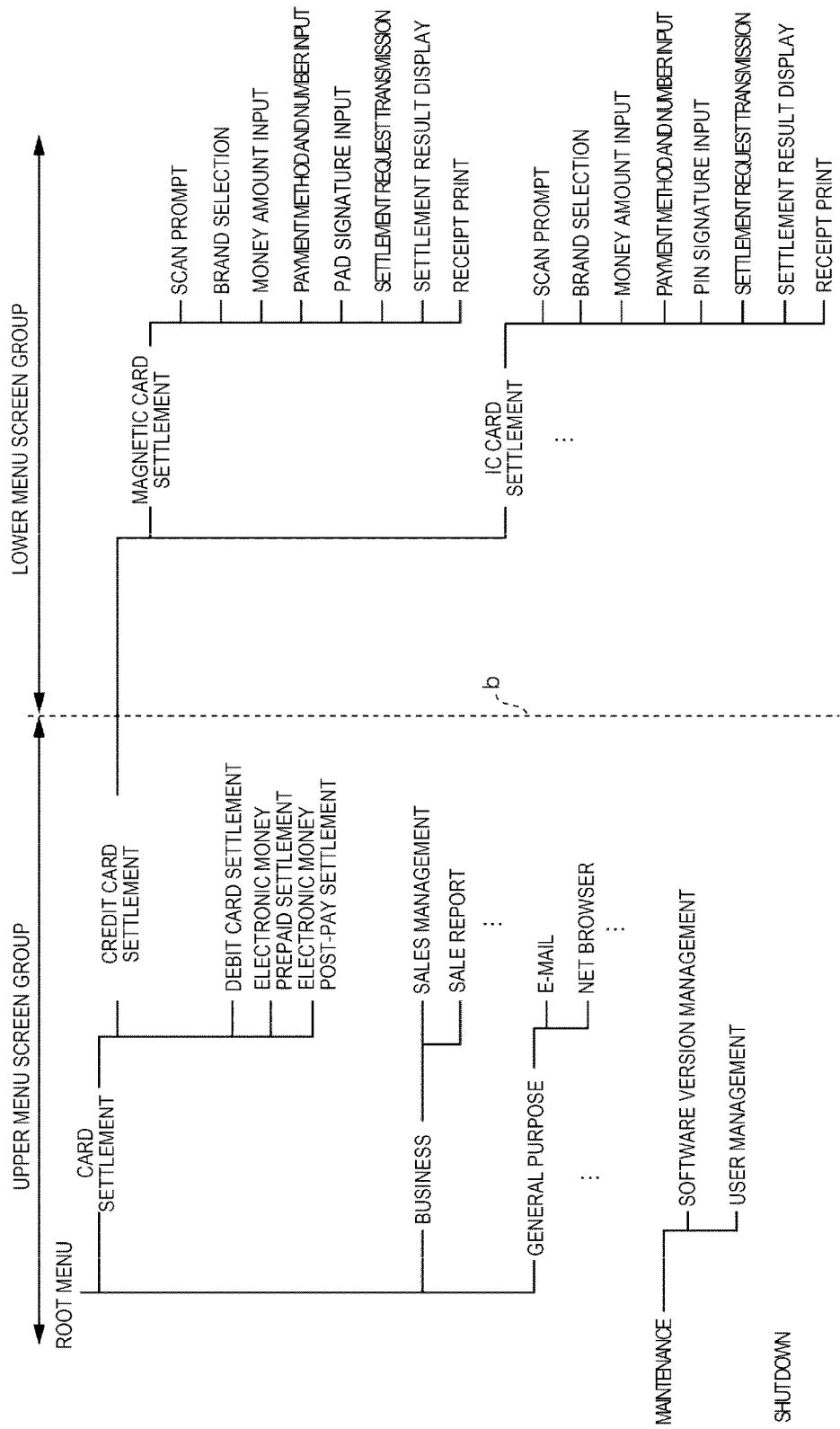
FIG. 10 is a diagram illustrating a hierarchical structure of a plurality of menu screens displayed on the display unit.

FIG. 10 is a diagram illustrating a hierarchical structure of a plurality of menu screens displayed on display unit 3B. Data indicating the plurality of menu screens and the hierarchical structure thereof is stored in flash ROM 32 in advance. In the hierarchical structure illustrated in FIG. 10, for example, menu screens (hereinafter, upper menu screens) belonging to an upper menu screen group are assigned to the left side from a boundary line of partition line b, and menu screens (hereinafter, lower menu screens) belonging to a lower menu screen group are assigned to the right side from the boundary line of partition line b. Further, in FIG. 10, for example, the lower menu screen is developed from the upper menu screen.

In FIG. 10, for example, respective menu screens of a root menu, maintenance, and shut down are assigned as top screens. Menu screens such as card settlement, business, and general purpose are assigned (developed) as lower menu screens than the menu screen of the root menu.

Further, respective menu screens of credit card settlement, debit card settlement, electronic money prepaid settlement, and electronic money post-pay settlement are assigned as lower menu screens than the menu screen of the card settlement.

Further, respective menu screens of magnetic card settlement and IC card settlement are assigned as lower menu screens than the menu screen of the credit card settlement.

Further, respective menu screens of scan prompt, brand selection, money amount input, payment method and number input, PAD signature input, settlement request transmission, settlement result display, and receipt print are assigned as lower menu screens than the menu screen of the magnetic card settlement. Similarly, respective menu screens of scan prompt, brand selection, money amount input, payment method and number input, PIN input, settlement request transmission, settlement result display, and receipt print are assigned as lower menu screens than the menu screen of the IC card settlement.

Meanwhile, respective menu screens of sales management and sales report are assigned as lower menu screens than the menu screen of business. Similarly, respective menu screens of an E-mail and a net browser are assigned as lower menu screens than the menu screen of general purpose. Further, meanwhile, respective menu screens of software version management and user management are assigned as lower menu screens than the menu screen of the maintenance.

In this exemplary embodiment, when return is performed (that is, the sleep mode is released) after transition to the sleep mode in the menu screen (that is, the upper menu screen) on the left side from partition line b illustrated in FIG. 10, a return destination becomes a predetermined screen (that is, the upper menu screen (see description below)).

On the other hand, when return is performed after transition to the sleep mode in the menu screen (that is, the lower menu screen) on the right side from partition line b illustrated in FIG. 10, a return destination becomes a menu screen displayed on display unit 3B of touch panel 3D immediately before the transition to the sleep mode.

FIG. 11 is a flowchart illustrating a settlement processing procedure of settlement terminal device 1 of the third exemplary embodiment. Since each process of the flowchart illustrated in FIG. 11 is the same as each process of the flowchart illustrated in FIG. 3 in the first exemplary embodiment described above, concrete description of each process will be omitted.

In settlement terminal device 1 of the third exemplary embodiment, CPU 21 causes display unit 3B of touch panel 3D to transition to the sleep mode during a period indicated by arrow g of FIG. 11 (that is, between a scan prompt display process of prompting to read the magnetic credit card in step S1 and a process of printing the confirmation result of various input matters of the transaction content as a receipt in step S8), unlike the second exemplary embodiment described above. However, in the period indicated by this arrow g, the screen displayed immediately before the transition to the sleep mode is displayed as the return destination screen at the time of returning from the sleep mode.

FIG. 12 is a flowchart describing a return processing procedure from the sleep mode of settlement terminal device 1 in the third exemplary embodiment. The return process illustrated in FIG. 12 is executed when an event of any input operation (for example, a key operation) of the operator with respect to settlement terminal device 1 occurs. The event of the input operation includes power switch 3E pressing interrupt, touch detection interrupt for touch input detection unit 3C, or the like. The occurrence of the event may be recognized by polling.

In FIG. 12, CPU 21 determines a type of (hereinafter, including classification or layer) of the screen (immediately previous screen) displayed on display unit 3B of touch panel 3D immediately before the transition to the sleep mode (S31). For example, information of the immediately previous screen becomes able to be recognized by CPU 21 checking the type of the screen loaded on latest date and time, which is held in use frequency counter 21B.

CPU 21 identifies whether the immediately previous screen is the upper menu screen (that is, the left menu screen) than partition line b illustrated in FIG. 10 or the lower menu screen (that is, right menu screen) (S32).

When the immediately previous screen is the lower menu screen than partition line b illustrated in FIG. 10 (NO in S32), CPU 21 causes the display of the immediately previous screen to be continued on display unit 3B of touch panel 3D (S33). For example, since all menu screens corresponding to concrete processing content regarding the settlement process are the lower screens than partition line b illustrated in FIG. 10, settlement terminal device 1 causes the immediately previous screen to be displayed as it is at the time of returning from the sleep mode.

On the other hand, when the immediately previous screen is the upper menu screen than partition line b illustrated in FIG. 10 (YES in S32), CPU 21 causes the upper menu screen than the immediately previous screen to be displayed as a predetermined screen on display unit 3B of touch panel 3D (S34). After the process of step S33 or S34, the process of CPU 21 ends. Thus, CPU 21 determines whether the menu screen is to be switched in display unit 3B of touch panel 3D after the sleep mode is released based on a type of screen (menu screen) displayed immediately before transition to the sleep mode.

Figure 13A:
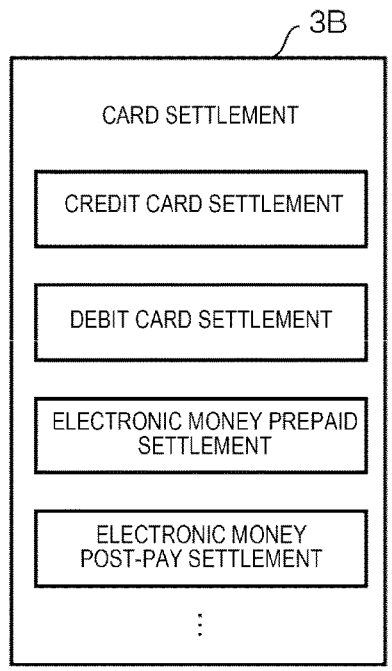
FIG. 13A is a diagram illustrating a menu screen displayed immediately before transition to a sleep mode.
Figure 13C:
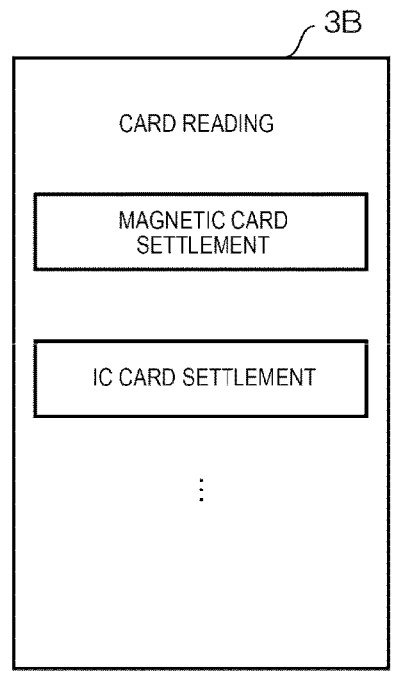
FIG. 13C is a diagram illustrating a menu screen displayed immediately before transition to the sleep mode.
Figure 13B:
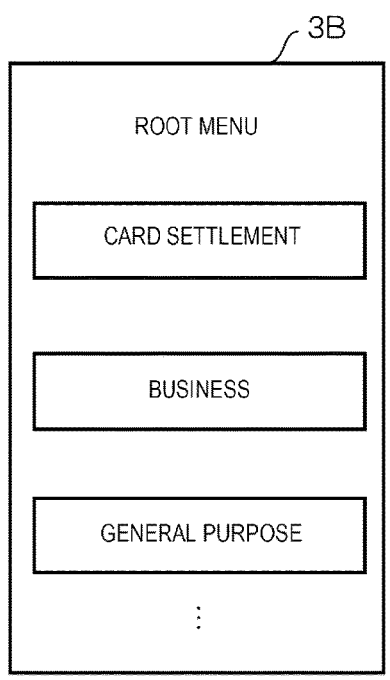
FIG. 13B is a diagram illustrating an upper menu screen displayed at the time of returning from the sleep mode in the menu screen of FIG. 13A.
Figure 13D:
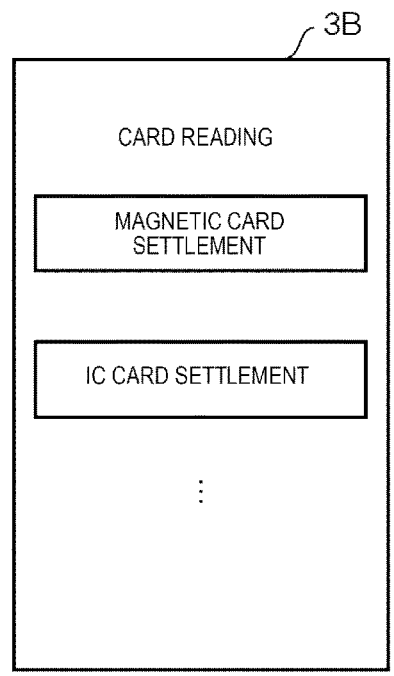
FIG. 13D is a diagram illustrating a menu screen as an immediately previous screen displayed at the time of returning from the sleep mode in the menu screen of FIG. 13C.

FIG. 13A is a diagram illustrating the menu screen displayed immediately before the transition to the sleep mode. FIG. 13B is a diagram illustrating the upper menu screen displayed at the time of return from the sleep mode in the menu screen of FIG. 13A. FIG. 13C is a diagram illustrating the menu screen displayed immediately before the transition to the sleep mode. FIG. 13D is a diagram illustrating the menu screen as an immediately previous screen displayed at the time of return from the sleep mode in the menu screen of FIG. 13C. In other words, the menu screen illustrated in FIG. 13C is the same as the menu screen illustrated in FIG. 13D.

Thus, in the third exemplary embodiment, when any one menu screen regarding the settlement process is displayed on display unit 3B of touch panel 3D, settlement terminal device 1 detects the input operation with respect to the menu screen. However, when no input operation is detected in the menu screen over certain time or more, settlement terminal device 1 causes display unit 3B of touch panel 3D to transition to the sleep mode. Further, when the input operation is detected after transition to the sleep mode, and thus, when the sleep mode is released, settlement terminal device 1 determines whether the menu screen to be displayed on display unit 3B of touch panel 3D is to be switched based on a type of menu screen displayed on display unit 3B of touch panel 3D immediately before the transition to the sleep mode.

Accordingly, since settlement terminal device 1 switches the menu screen after release of the sleep mode, based on a type (classification) of menu screen displayed immediately before transition to the sleep mode, when the sleep mode of display unit 3B of touch panel 3D is released, by considering that a type of menu screen displayed immediately before transition to the sleep mode depends on an input operation performed by the operator under a determination or consciousness of the operator, it is possible to suppress displaying of the menu screen not intended by the operator, and also to improve convenience of the input operation for the operator.

Further, when the menu screen displayed on display unit 3B of touch panel 3D immediately before the transition to the sleep mode is a menu screen assigned to an upper layer than a predetermined layer defined in a predetermined hierarchical relationship, settlement terminal device 1 switches the menu screen displayed on display unit 3B of touch panel 3D immediately before the transition to the sleep mode to a predetermined screen and displays the predetermined screen on display unit 3B of touch panel 3D. Accordingly, when the menu screen assigned to the upper layer than the predetermined layer is displayed immediately before the transition to the sleep mode, settlement terminal device 1 switches a menu screen to be displayed on display unit 3B of touch panel 3D after the sleep mode is released, to the predetermined screen, for example, by considering that the operator is highly likely to select or seek any concretely intended process. Thus, it is possible to simply select the process desired by the operator.

Further, when the menu screen displayed on display unit 3B of touch panel 3D immediately before the transition to the sleep mode is a menu screen assigned to a lower layer than a predetermined layer, settlement terminal device 1 continues to display the menu screen displayed on display unit 3B of touch panel 3D immediately before the transition to the sleep mode. Accordingly, when the menu screen assigned to the lower layer than the predetermined layer is displayed immediately before the transition to the sleep mode, settlement terminal device 1 continues to display the menu screen displayed immediately before the transition to the sleep mode as it is, as a menu screen to be displayed on display unit 3B of touch panel 3D after the sleep mode is released, for example, by considering that the operator is highly likely to concretely intend to execute any process. Thus, it is possible to rapidly execute the process desired by the operator.

In this exemplary embodiment, in the menu screen on the left side from partition line b illustrated in FIG. 10, a return destination at the time of returning from the sleep mode is the upper screen as a predetermined screen, but may be a return destination shown next. For example, a top menu screen (that is, a card settlement menu screen) in the settlement process may be the return destination. Accordingly, since the predetermined screen is a screen assigned to an upper layer than a layer corresponding to the screen displayed on the touch panel immediately before transition to the sleep mode among the plurality of screens regarding the settlement process, settlement terminal device 1 can simply select the process or the screen desired by the operator as the screen to be displayed on display unit 3B of touch panel 3D after the sleep mode is released.

Further, a specific menu screen designated by a manager or the like of the acquirer or the settlement processor may be the return destination. Accordingly, since the predetermined screen is a screen assigned to any one layer in a predetermined hierarchical relationship designated according to predetermined input operations of the manager or the like of the acquirer or the settlement processor in advance, settlement terminal device 1 displays a screen assigned to the layer according to the predetermined input operation (for example, an instruction from the acquirer or the settlement processor) as a screen to be displayed on display unit 3B of touch panel 3D after the sleep mode is released, and thus, it is possible to improve convenience for the operation of the operator by displaying a menu that is a start point when the operation of the operator is unskilled or difficult.

Further, a screen of which the use frequency counted by use frequency counter 21B is equal to or greater than a predetermined value (that is, a screen with a high use frequency) among the plurality of menu screens held in flash ROM 32 may be the return destination. Accordingly, since the predetermined screen is a screen regarding the settlement process and is a screen of which the display frequency in display unit 3B of touch panel 3D is equal to or more than a predetermined value and that is assigned to an upper layer than the predetermined layer, settlement terminal device 1 displays the process or the menu frequently used by the operator as a menu screen to be displayed on display unit 3B of touch panel 3D after the sleep mode is released, and thus, it is possible to give a sense of security at the time of an operation of the operator, and to improve convenience. When there are a plurality of screens having a high use frequency, settlement terminal device 1 may determine, for example, an upper screen than the immediately previous screen to the return destination.

Process of Reaching Content of the Fourth Exemplary Embodiment

First, a process of reaching content of settlement terminal device 1 of the fourth exemplary embodiment will be described prior to describing the fourth exemplary embodiment.

In the small settlement terminal in Japanese Patent Unexamined Publication No. 2011-48486, the information display area and the information input area are set in the display area of the touch panel type display unit, and the numeral keypad image pattern is displayed in the information input area so that an input operation with respect to the numeral keypad image pattern can be performed. Further, this small settlement terminal includes the printer, prints information such as a result of the settlement process on a rolled paper built into the terminal in advance, and discharges a receipt on which printing content has been printed from a sheet discharge outlet. In this small settlement terminal, power from an external commercial power supply (for example, AC 100 V) is supplied through an AC adapter accommodated in the housing.

However, in the configuration of Japanese Patent Unexamined Publication No. 2011-48486, when a printer is operating, much power is consumed due to power of a paper feed mechanism of the small settlement terminal or driving of a printing head for printing on the printing paper. Therefore, when the printer is operating (that is, the printer is printing), much power is consumed inside the small settlement terminal, and accordingly, an internal temperature of the small settlement terminal suddenly rises. Accordingly, when the internal temperature of the small settlement terminal rises, electronic parts or the like mounted on an internal circuit board are likely to malfunction or deteriorate. Therefore, it is necessary to suppress power consumption of the small settlement terminal, and suppress a total amount of current flowing into an AC adapter. Further, it is necessary to use parts with a large volume and weight capable of supplying high power and high current for the AC adapter, and it is necessary to downsize the AC adapter when the AC adapter is installed in a store where a wide installation space is not secured.

Fourth Exemplary Embodiment

Therefore, an example of a transaction terminal device in which some functions or processes are temporarily suppressed or stopped when a printer is operating, to thereby reduce a total amount of current flowing into the power supply unit accommodated inside the housing and suppress power consumption will be described in the fourth exemplary embodiment.

Since an appearance of settlement terminal device 1 of the fourth exemplary embodiment is the same as the appearance of the settlement terminal device of the first exemplary embodiment described above (see FIG. 1), the same reference signs are used and description thereof will be omitted.

Figure 14:
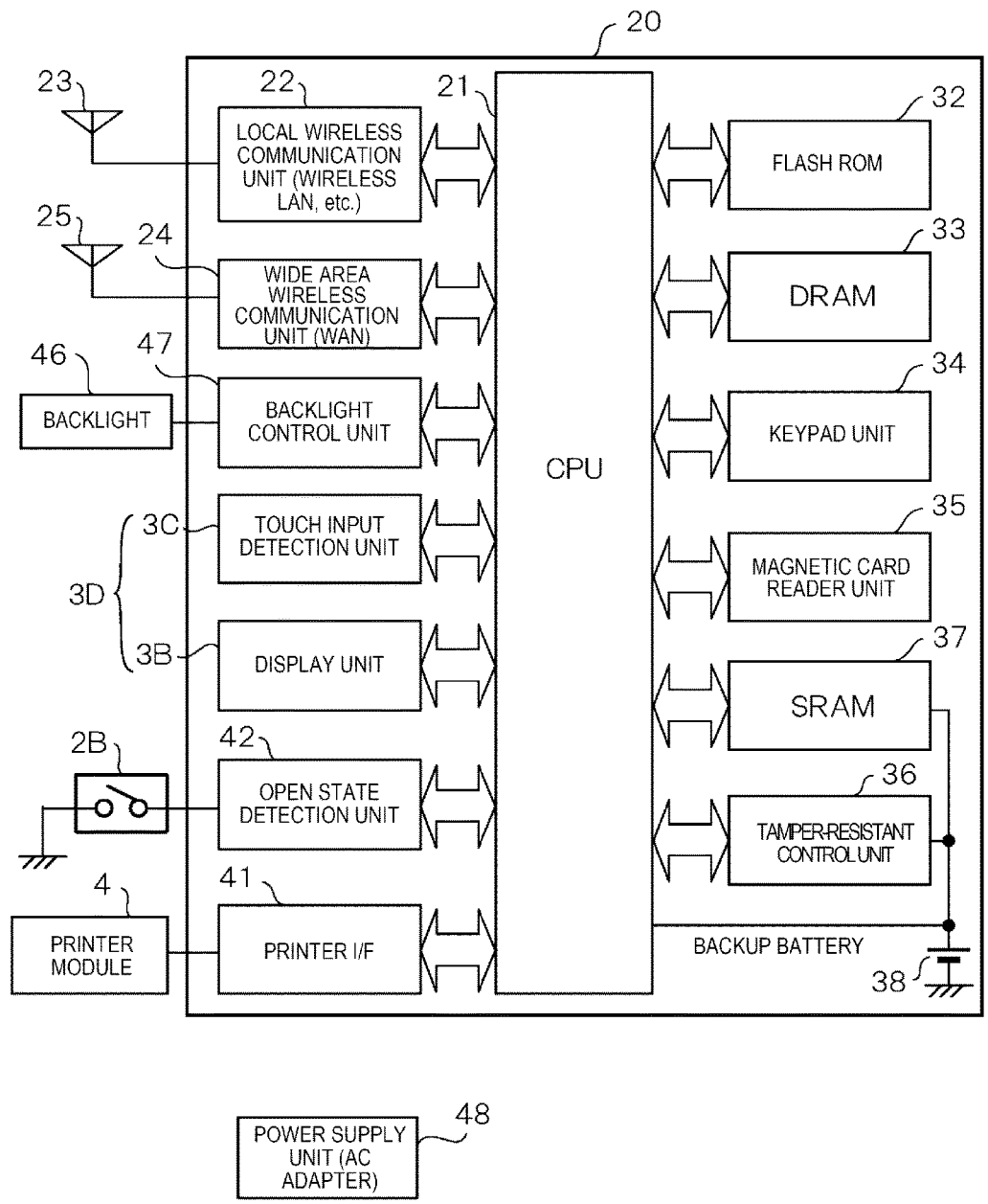
FIG. 14 is a block diagram concretely illustrating an example of a hardware configuration of the settlement terminal device of the fourth exemplary embodiment.

FIG. 14 is a block diagram concretely illustrating an example of a hardware configuration of settlement terminal device 1 of the fourth exemplary embodiment. Further, in the hardware configuration of settlement terminal device 1, the same components as those of settlement terminal device 1 of the first exemplary embodiment are denoted with the same reference signs and description thereof will be omitted.

Settlement terminal device 1 illustrated in FIG. 14 further includes backlight 46 as an example of an illumination unit that turns on and illuminates display unit 3B that displays the screen regarding the settlement process, and a backlight control unit 47 that performs various controls such as turn-on, dimming (weakening), and turn-off of backlight 46, in addition to the configuration of settlement terminal device 1 illustrated in FIG. 1. Backlight control unit 47 is connected to CPU 21.

Backlight control unit 47 performs various controls such as turning on, dimming, or turning off of backlight 46 in response to an instruction from CPU 21. For example, backlight control unit 47 performs turning off or dimming of backlight 46 by turning off backlight 46 or gradually dimming backlight 46. Further, backlight control unit 47 may have a dimming function of continuously changing an amount of emitted light of backlight 46.

Further, settlement terminal device 1 illustrated in FIG. 14 includes power supply unit 48 for supplying power as a power source to each unit included in information processing unit 20. This power supply unit 48 is accommodated in a housing of settlement terminal device 1, and can be realized using, for example, an AC adapter having relatively small capacity.

Since a flow of the settlement process in settlement terminal device 1 of this exemplary embodiment is the same as the operation procedure in settlement terminal device 1 of the first exemplary embodiment described above (see FIG. 3), description thereof will be omitted and a different operation will be hereinafter described.

Figure 15:
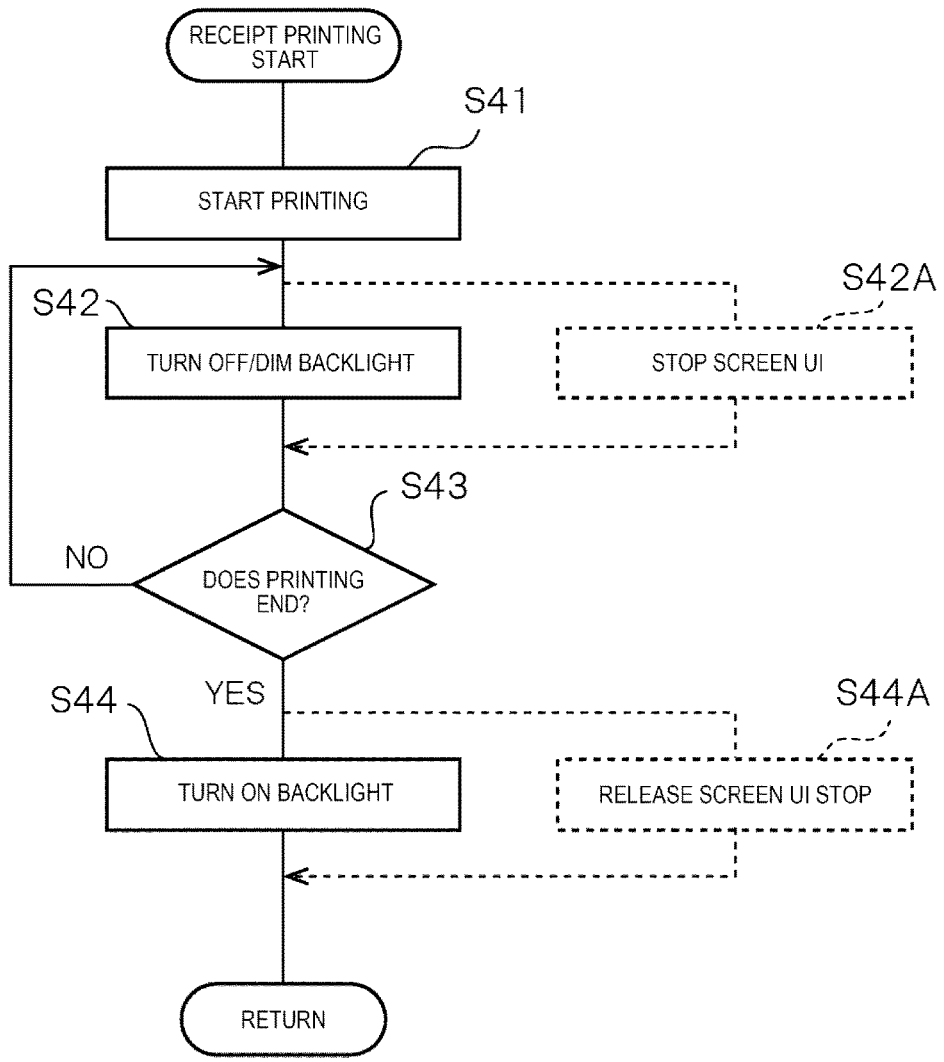
FIG. 15 is a flowchart illustrating a receipt printing operation procedure in step S8 illustrated in FIG. 3 in the settlement terminal device of the fourth exemplary embodiment.

FIG. 15 is a flowchart illustrating a receipt printing operation procedure in step S8 illustrated in FIG. 3 in settlement terminal device 1 of the fourth exemplary embodiment.

In FIG. 15, CPU 21 starts a process of printing the result of confirming the transaction content that is a settlement processing target as a receipt (S41). CPU 21, for example, starts printing in step S41 and gives an instruction to backlight control unit 47 to cause turn off or dim backlight 46 (S42). From the point of view of suppression of power consumption, it is preferable for CPU 21 to turn off backlight 46. An operation of turning off or dimming this backlight 46 is performed before a printing operation actually starts after the printing process starts in step S41, or after the printing operation starts. From the point of view of suppression of power consumption, it is preferable turn off or dim the backlight before an operation of a printing head or a motor (both not illustrated) of printer module 4 or a printing operation such as a process of transferring print data from printer I/F 41 to printer module 4 is started.

CPU 21 determines whether printing ends (S43). When the printing does not end (NO in S43), the process of CPU 21 returns to step S42.

On the other hand, when the printing ends (YES in S43), CPU 21 gives an instruction to backlight control unit 47 to turn on backlight 46 that has been turned off dimmed (S44). Then, the process of CPU 21 returns to a time point of the process of step S8 illustrated in FIG. 3. That is, the operation of settlement terminal device 1 ends.

CPU 21 may start printing in step S41 and also perform turn-off/dimming control of backlight 46 in step S42 to perform a process of stopping touch panel 3D (that is, the process of detecting an input operation of a screen UI (User Interface) and a process of displaying a screen or the like such as graphics processing or driving of a liquid crystal display plate driver) (S42A). In other words, CPU 21 stops the detection of the touch input operation using touch input detection unit 3C or stops display of the screen (for example, the screen regarding the settlement process) using display unit 3B in the process of stopping the screen UI (that is, a process of stopping touch panel 3D). Then, the process of CPU 21 proceeds to step S43.

Further, when printing ends in step S43, CPU 21 turns on backlight 46 in step S44 and performs a process of releasing stop of a screen UI (touch panel 3D) (S44A). Then, the process of CPU 21 ends, and the process returns to a time point of the process of step S8 illustrated in FIG. 3. That is, the operation of settlement terminal device 1 ends.

Thus, settlement terminal device 1 of the fourth exemplary embodiment, for example, dims or turns off backlight 46 that illuminates display unit 3B of touch panel 3D, which displays the screen regarding the settlement process, while information regarding the settlement process is being printed in printer module 4.

Accordingly, since settlement terminal device 1 temporarily dims (suppresses) or turns off (stops), preferentially, backlight 46, which controls an illumination for display unit 3B of touch panel 3D, as some functions or processes while printer module 4 is operating, it is possible to reduce a total amount of current flowing into power supply unit 48 (for example, an AC adapter) accommodated inside the housing of settlement terminal device 1 and to suppress power consumption in settlement terminal device 1.

Further, since settlement terminal device 1 turns on backlight 46 that has been dimmed or turned off after printing of the information regarding the settlement process using printer module 4 has ended, it is possible to further suppress an increase in the total amount of current flowing into power supply unit 48 accommodated inside the housing of settlement terminal device 1 even when turn-on of backlight 46 is continued in a period other than a printing period in which power consumption increases.

Further, since settlement terminal device 1 temporarily stops the function of touch panel 3D, including touch input detection unit 3C for detecting the input operation with respect to the screen regarding the settlement process, in addition to preferential dimming or turn-off of backlight 46 while the information regarding the settlement process is being printed by printer module 4, it is possible to further suppress an increase in the total amount of current flowing into power supply unit 48 accommodated inside the housing of settlement terminal device 1.

Further, since settlement terminal device 1 releases stop of the detection of the input operation in touch input detection unit 3C of touch panel 3D after printing of the information regarding the settlement process using printer module 4 ends, it is possible to suppress an increase in the total amount of current flowing into power supply unit 48 accommodated inside the housing of settlement terminal device 1 even when the detection process of the input operation is continued in addition to turn-on of backlight 46 in a period other than a printing period in which power consumption increases.

Further, since settlement terminal device 1 temporarily stops a process of power supply to display unit 3B of touch panel 3D, in addition to dimming or turn-off of backlight 46, while the information regarding the settlement process is being printed using printer module 4, it is possible to further suppress an increase in the total amount of current flowing into power supply unit 48 accommodated inside the housing of settlement terminal device 1.

Further, since settlement terminal device 1 releases stop of the power supply to display unit 3B of touch panel 3D after printing of the information regarding the settlement process using printer module 4 ends, it is possible to suppress an increase in the total amount of current flowing into power supply unit 48 accommodated inside the housing of settlement terminal device 1 even when power supply to display unit 3B of touch panel 3D is continued, in addition to turn-on of backlight 46, in a period other than a printing period in which power consumption increases.

While various exemplary embodiments have been described above with reference to the drawings, it is understood that the present disclosure is not limited to such exemplary embodiments. It is apparent that various change examples or modification examples can be derived in the category defined in claims by those skilled in the art, and it is understood that these belong to the technical scope of the present invention.

What is claimed is:

1. A transaction terminal device, comprising:
    a touch panel which, in operation, displays simultaneously one or more first software keys relating to a transaction settlement process, one or more second software keys relating to the transaction settlement process, and a software drag-and-drop key configured to be moved to a yes position or a no position;
    a touch input detector coupled to the touch panel; and
    processing circuitry coupled to the touch panel and the touch input detector and which,
        in response to the touch input detector detecting a touch on one of the one or more first software keys, executes processing assigned to the touched first software key, and
        in response to the touch input detector detecting a touch on one of the one or more second software keys, if the software drag-and-drop key is in the yes position as detected by the touch input detector, executes processing assigned to the touched second software key, and if the software drag-and-drop key is not in the yes position as detected by the touch input detector, does not execute the processing assigned to the touched second software key.

2. The transaction terminal device of claim 1, wherein the one or more second software keys include a transaction amount entry key and a credit card type entry key.

3. The transaction terminal device of claim 2, wherein the one or more second software keys include a payment installment number entry key.

4. The transaction terminal device of claim 2, wherein the one or more second software keys include a confirmation key to confirm a transaction.

5. The transaction terminal device of claim 1, wherein the one or more first software keys are alphanumeric keys.

6. The transaction terminal device of claim 1, wherein the processing circuitry, in response to the touch input detector detecting a touch on one of the one or more second software keys, if the software drag-and-drop key is in the no position as detected by the touch input detector, discards the detection of the touched second software key.

7. The transaction terminal device of claim 1, wherein the processing circuitry, in response to the touch input detector detecting a touch on one of the one or more second software keys, if the software drag-and-drop key is neither in the yes position or in the no position as detected by the touch input detector, waits for the software drag-and-drop key to be placed in the yes position.

8. The transaction terminal device of claim 1, wherein the processing circuitry, in response to the touch input detector detecting a touch on one of the one or more second software keys, if the software drag-and-drop key is placed in the yes position as detected by the touch input detector within a defined time period from the detection of the touched second software key, executes the processing assigned to the touched second software key.

* * * * *